US007922398B2

(12) United States Patent
Nozawa et al.

(10) Patent No.: US 7,922,398 B2
(45) Date of Patent: Apr. 12, 2011

(54) LIQUID CARTRIDGE, LOADING/UNLOADING DEVICE OF LIQUID CARTRIDGE, RECORDING APPARATUS, AND LIQUID EJECTION APPARATUS

(75) Inventors: Izumi Nozawa, Nagano (JP); Satoshi Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 694 days.

(21) Appl. No.: 11/909,875

(22) PCT Filed: Mar. 28, 2006

(86) PCT No.: PCT/JP2006/307015

§ 371 (c)(1), (2), (4) Date: Sep. 27, 2007

(87) PCT Pub. No.: WO2006/104242

PCT Pub. Date: Oct. 5, 2006

(65) Prior Publication Data

US 2009/0251512 A1 Oct. 8, 2009

(30) Foreign Application Priority Data

Mar. 28, 2005 (JP) ................................ 2005-091531
Mar. 27, 2006 (JP) ................................ 2006-084818

(51) Int. Cl.
*G02B 6/36* (2006.01)

(52) U.S. Cl. ........................................ 385/86; 385/84

(58) Field of Classification Search ............... 347/84–86
See application file for complete search history.

(56) References Cited

U.S. PATENT DOCUMENTS

| | | | | |
|---|---|---|---|---|
| 5,512,926 | A | 4/1996 | Uchikata et al. | |
| 5,534,899 | A | 7/1996 | Uchikata et al. | |
| 6,003,985 | A | 12/1999 | Bekki | |
| 6,070,975 | A | 6/2000 | Uchikata et al. | |
| 6,296,345 | B1 | 10/2001 | Kline et al. | |
| 6,488,369 | B1 * | 12/2002 | Steinmetz et al. | 347/86 |
| 7,300,142 | B1 * | 11/2007 | Usui et al. | 347/86 |

(Continued)

FOREIGN PATENT DOCUMENTS

EP 0 715 959 A2 6/1996

(Continued)

OTHER PUBLICATIONS

Chinese Office Action (with English translation), issued Apr. 3, 2009 in Chinese counterpart application.

(Continued)

*Primary Examiner* — Ellen Kim
(74) *Attorney, Agent, or Firm* — Stroock & Stroock & Lavan LLP

(57) ABSTRACT

A cartridge loading/unloading device includes a cartridge holding mechanism 154 which holds a liquid cartridge 80 when a liquid cartridge 80 is inserted by a first predetermined stroke, and a power transmission converting mechanism 153 which ensures a push-in force required for loading of the ink cartridge 80 using the principle of the lever by the rotational motion of a lever arm 160, and which converts the rotational motion of the lever arm 160 into a second predetermined stroke S of movement required for loading of the ink cartridge 80 in a state in which it is held by the cartridge holding mechanism 154. The cartridge holding mechanism 154 includes an integral engaging member 155 which is engaged with the front side of one surface of the ink cartridge 80 in its loading direction across the center of the one surface.

14 Claims, 16 Drawing Sheets

U.S. PATENT DOCUMENTS

| | | | | |
|---|---|---|---|---|
| 7,367,662 | B2 | 5/2008 | Kimura et al. | |
| 7,452,062 | B2 | 11/2008 | Kimura et al. | |
| 7,559,638 | B2 | 7/2009 | Kimura et al. | |
| 7,666,363 | B2 | 2/2010 | Diamond et al. | |
| 7,669,993 | B2 * | 3/2010 | Hashii et al. | 347/86 |
| 2004/0119799 | A1 | 6/2004 | Kulpa et al. | |
| 2007/0158475 | A1 | 7/2007 | Kimura et al. | |
| 2008/0151019 | A1 | 6/2008 | Kimura et al. | |
| 2008/0151020 | A1 | 6/2008 | Kimura et al. | |
| 2008/0204530 | A1 | 8/2008 | Kimura et al. | |
| 2008/0218568 | A1 | 9/2008 | Kimura et al. | |
| 2009/0237448 | A1 | 9/2009 | Kimura et al. | |
| 2009/0251512 | A1 | 10/2009 | Nozawa et al. | |
| 2010/0025602 | A1 | 2/2010 | Kimura et al. | |

FOREIGN PATENT DOCUMENTS

| | | | |
|---|---|---|---|
| EP | 0 872 355 | A2 | 10/1998 |
| EP | 1504907 | A2 | 2/2005 |
| EP | 1504907 | A3 | 5/2005 |
| EP | 1 547 785 | A2 | 6/2005 |
| JP | 162335 | A | 12/1991 |
| JP | 162330 | A | 6/1993 |
| JP | 11-157094 | A | 6/1999 |
| JP | 2005-502034 | | 1/2005 |
| JP | 2005-047089 | | 2/2005 |
| WO | 03/010427 | | 3/2003 |
| WO | WO 2006/104242 | | 10/2006 |

OTHER PUBLICATIONS

Written Opinion of the International Searching Authority in Int'l appln. No. PCT/JP2006/307015 (Jun. 28, 2006).

International Search Report in Int'l appln. No. PCT/JP2006/307015 (Jun. 28, 2006).

Extended European Search Report issued on Oct. 12, 2010 for European Patent Appln. No. 10174159.3 in the name of Seiko Epson Corporation.

* cited by examiner

LIQUID CARTRIDGE, LOADING/UNLOADING DEVICE OF LIQUID CARTRIDGE, RECORDING APPARATUS, AND LIQUID EJECTION APPARATUS

TECHNICAL FIELD

The present invention relate to a liquid cartridge, a loading/unloading device which allows the liquid cartridge to be slid and loaded on a recording apparatus body, a recording apparatus including the loading/unloading device, and a liquid ejection apparatus including the loading/unloading device.

BACKGROUND ART

Although the liquid consuming apparatus means general apparatuses which consume the liquid supplied from a predetermined part at the time of operation, a liquid ejection apparatus which ejects droplets from an ejection head can be exemplified as a representative example of the liquid consuming apparatus. In addition, the liquid ejection apparatus is not limited to recording apparatuses, such as an ink jet recording apparatus, a copying machine, and a facsimile, which eject ink from a recording head as a liquid ejection head to recording material, such as a recording paper, and performs recording to the recording material, but is meant to include apparatuses which ejects a liquid corresponding to a specific application to a material to be ejected equivalent to the recording material from a liquid ejection head equivalent to the above-mentioned recording head, thereby adhering the liquid to the material to be ejected.

Further, in addition to the recording head mentioned above, the liquid ejection head include, for example, a color material ejection head used to manufacture color filters of a liquid crystal display, etc., an electrode material (conductive paste) ejection head used to form electrodes of an organic electroluminescent (EL) display, a field emitting display (FED), etc., a living organic material ejection head used to manufacture biochips, and a sample ejection head as a precision pipette which ejects samples.

Hereafter, a description will be made taking an ink jet printer as an example of the ink jet recording apparatus or the liquid ejection apparatus.

In a case in which the ink jet printer is loaded with an ink cartridge (liquid cartridge), a relatively large push-in force is needed. In this case, when an ink cartridge is prepared for every color, a push-in force of about 4.9 to 6.9 N is sufficient. However, in a case where an integral single-package-type ink cartridge is prepared for a plurality of colors, for example, the plurality of colors are, for example, six, seven needles are provided in the ink cartridge. Therefore, a very large push-in force of 34.3 to 48.3 N is needed. The loading of an ink cartridge by such a large push-in force is possible somehow or other when the ink cartridge is loaded in the vertical direction. However, when an ink cartridge is allowed to be slid and loaded in the horizontal direction, an excessive force is also applied the ink jet printer and therefore the loading of the ink cartridge is practically impossible.

JP-H11-157094-A discloses a loading/unloading device of an ink cartridge (loading/unloading device of a liquid cartridge) capable of obtaining a large push-in force using the principle of the lever. That is, the rotational motion of a cartridge loading/unloading lever is transmitted to a link plate, thereby enabling unlocking of a linking lever and loading of the ink cartridge to a holder.

However, this loading/unloading device was developed for the purpose of loading of the ink cartridge for every color, and does not has a large push-in force which can respond to an integral single-package-type ink cartridge for a plurality of colors. Further, providing the cartridge loading/unloading lever and the link plate to the ink cartridge for every color leads to an increase in the number of parts which causes an increase in the cost of parts.

Further, the ink cartridge receives a force that will put back the ink cartridge from a flow passage member connected therewith during loading and after loading. Accordingly, the ink cartridge has to be loaded with a push-in force exceeding this force and this state has to be maintained, otherwise a gap may be provided between the ink cartridge and the flow passage member. As a result, contacts respectively provided at the ink cartridge and the flow passage member will deviate one from the other, which makes it impossible to detect the residual amount of ink, etc.

Further, positional deviation of the contacts is caused by variation in the dimensional tolerances of parts. However, the construction which ensures such a large push-in force and ensures a tight contact state is not disclosed in JP-H11-157094-A.

Further, EP-1547785-A discloses a loading/unloading device (cartridge loading/unloading device) 500 for a flat shape ink cartridge 508 as shown in FIG. 18, which loads the ink cartridge 508 with both right and left sides of the ink cartridge 508 latched.

First, if the ink cartridge 508 is inserted in the direction of the arrow, latch projections 555*a* of the cartridge holding means 555 moves toward the ink cartridge to be engaged with recesses 508*a* formed in the ink cartridge 508.

Next, the ink cartridge 508 is pushed in by the rotational operation of a lever arm (not shown) by a predetermined stroke. With this engagement, ink supply needles 502 formed in a flow passage unit 501 is pushed into needle insertion openings 508*b* of the ink cartridge 508, thereby completing loading of the ink cartridge 508.

However, in the loading/unloading device 500, in order to insert the ink cartridge 508 smoothly, an opening (ink cartridge insertion opening) of the loading/unloading device 500 into which the ink cartridge 508 is inserted is required to be slightly larger than the dimension of the ink cartridge 508.

Therefore, there is a possibility that the ink cartridge 508 may be inserted in a skew state, and loaded with only one side thereof latched. In other words, erroneous loading caused by so-called erroneous insertion may be caused. Accordingly, when an ink needle is not normally stuck into the cartridge, there is a possibility that ink leakage may be caused from that part.

DISCLOSURE OF THE INVENTION

The present invention has been accomplished in view of such situations. An object of the present invention is therefore to provide a liquid cartridge capable of being reliably loaded by preventing skew insertion thereof when the cartridge is inserted into a cartridge mounting section of a liquid consuming apparatus by sliding operation of a cartridge loading/unloading device. Another object of the present invention is to provide a liquid cartridge loading/unloading device, a recording apparatus including the liquid cartridge loading/unloading device, and a liquid ejection apparatus including the liquid cartridge loading/unloading device, which, even if an integral single-package-type flat liquid cartridge is used for a plurality of colors, can obtain a large push-in force with a very small force, reliably load the liquid cartridge, and simply take out the ink cartridge without causing any positional deviation.

The above object of the present invention is achieved by a liquid cartridge including: a container body which is detachably mountable on a cartridge mounting section of a liquid consuming apparatus by a cartridge loading/unloading device, and a liquid supply port which is provided on a leading end surface of the container body in its insertion direction to supply liquid to a liquid supply portion provided on the cartridge mounting section. One of a top surface and a bottom surface of the container body, which is orthogonal to the leading end surface of the container body, is provided with an engaging recess to be engaged with an engaging member of the cartridge loading/unloading device.

According to the liquid cartridge of the above construction, the engaging recess which is engaged with the engaging member of the cartridge loading/unloading device is provided in one of a top surface and a bottom surface of the container body.

Further, for example, when a plurality of engaging recesses are provided across a central portion of the container body, the spacing between the engaging recesses can be narrowed compared with an ink cartridge which has engaging recesses in both the right and left side surfaces of a container body.

Thus, the liquid cartridge of the present invention is hardly inclined at the time of cartridge mounting compared with the ink cartridge having the engaging recesses in both the right and left side surfaces, whereby skew insertion of the ink cartridge is prevented.

Accordingly, the cartridge mounting section can be reliably loaded with an ink cartridge, and occurrence of troubles the liquid leakage resulting from the erroneous loading by skew insertion, etc. can be prevented.

In addition, in the liquid cartridge of the above construction, it is preferable that the engaging recess be provided near the leading end surface of the container body in its insertion direction.

According to the liquid cartridge of such a construction, the engaging recess and the liquid supply port provided in the leading end surface of the container body in the insertion direction are brought close to each other. As a result, variation in the positional accuracy of the engaging recess with respect to the ink supply portion provided on the cartridge mounting section can be reduced, and the right and left inclination of the container body can be further prevented.

Further, in the liquid cartridge of the above construction, it is preferable that the engaging recess is provided near positioning means which position the container body with respect to the cartridge mounting section.

According to the liquid cartridge of such a construction, since the engaging recess is formed near the positioning means, the positional accuracy of the engaging recess with respect to the ink supply portion, etc. provided on the cartridge mounting section can be further improved, and inclination prevention of the container body can be further promoted.

Further, in the liquid cartridge of the above construction, it is preferable that the positioning means be a pair of positioning holes provided on both sides in the leading end surface of the container body in its insertion direction, and the engaging recess be disposed between the positioning holes.

According to the liquid cartridge of such a construction, since the inclination (an amount of offset) occurring in the engaging recess is regulated to be smaller than an amount of offset generated between the pair of positioning holes when the container body is inserted, the inclination can be further suppressed.

Further, in the liquid cartridge of the above construction, it is preferable that the container body be moved in a cartridge mounting direction when the engaging member of the cartridge loading/unloading device presses and urges an abutting part provided in a front wall surface of the engaging recess in the insertion direction.

According to the liquid cartridge of such a construction, even if there is an error in the length dimensions, etc. of the container body in the insertion direction, regardless of the dimensional error of the container body, the abutment between the engaging member and the abutting part can be made uniform by allowing the engaging member of the cartridge loading/unloading device to abut against the abutting part of the engaging recess. Thus, it is possible to improve the positioning accuracy of an ink cartridge at the time of insertion, and to load the ink cartridge more reliably.

Moreover, in the liquid cartridge of the above construction, it is preferable that the position of the abutting part in a height direction be located near a horizontal plane passing through the centers of the positioning holes.

According to the liquid cartridge of such a construction, since the pressing force which acts on the abutting part from the engaging member of the cartridge loading/unloading device acts in the substantially horizontal plane passing through the centers of the positioning holes, and it does not generate the component force which twists the leading end of the cartridge upwardly or downwardly, it can prevent the upward and downward inclination of the container body.

Further, in the liquid cartridge of the above construction, it is preferable that the abutting part includes protrusions or ribs provided near both side walls of the engaging recess in the insertion direction.

According to the liquid cartridge of such a construction, the vicinities of both the side walls of the engaging recess in the insertion direction formed in the shape of a box have a high rigidity near corners. Thus, by constructing the abutting part by protrusions or ribs provided near both the side walls having a high rigidity, for example, the rigidity of the abutting part becomes high and the positioning accuracy at the time of abutment of the engaging member of the ink cartridge loading/unloading device improves, as compared with the case where the abutting part is provided in the center of the leading end surface (inner wall surface) of the engaging recess in the insertion direction.

Further, in the liquid cartridge of the above construction, it is preferable that the container body includes a pair of upper and lower cases, and the abutting part be provided near one of the cases which is positioned with respect to the cartridge mounting section.

According to the liquid cartridge of such a construction, the positioning means with respect to the cartridge mounting section and the abutting part that is positioning means for the engaging member of the ink cartridge loading/unloading device are disposed on the common case, deterioration of positioning accuracy caused by the assembling error of case parts can be avoided, and the operation by the ink cartridge loading/unloading device can be made smoother by an improvement in positioning accuracy.

Further, the above object of the present invention is achieved by a cartridge loading/unloading device which allows a liquid cartridge to be slid and loaded on a recording apparatus body. The device includes a cartridge holding mechanism which holds the liquid cartridge when the liquid cartridge is inserted by a first predetermined stroke, and a power transmission converting mechanism which ensures a push-in force required for loading of the ink cartridge using the principle of the lever by the rotational motion of a lever arm, and which converts the rotational motion of the lever arm into a second predetermined stroke of movement required for loading of the ink cartridge in a state in which it is held by the cartridge holding mechanism. The cartridge holding mechanism has an integral engaging member which is engaged with the front side of one surface of the ink cartridge in its loading direction across the center of the one surface.

Here, “insertion of a liquid cartridge” means a state in which the liquid cartridge is inserted into a recording apparatus from outside the recording apparatus, and is held by a cartridge holding mechanism. Further, “loading of a liquid cartridge” means a state in which the liquid cartridge held by the cartridge holding mechanism is pushed in together with the cartridge holding mechanism by rotation of a lever, and is stuck by liquid supply needles.

In order to smoothly insert a liquid cartridge into a recording apparatus body, a certain degree of gap, so-called, clearance is required between the liquid cartridge and an insertion opening into which the liquid cartridge is inserted. Therefore, when the liquid cartridge is inserted, there is a possibility that this liquid cartridge may incline. On the other hand, the cartridge holding mechanism is provided so that the ink cartridge may be engaged with a plurality of surfaces, for example, both side surfaces onto which the cartridge is to be loaded normally, that is, without inclining. However, when the liquid cartridge inclines, there is a possibility that the cartridge may be held by only one of the side surfaces and it may not be loaded normally.

Further, when a liquid cartridge is loaded, there are many cases that a heavy liquid cartridge may be loaded because of the unused liquid cartridge, i.e., the liquid fully contained in the cartridge. In that case, if the engaging member is engaged with the liquid cartridge at a position away from the center of gravity of the liquid cartridge in a direction vertical to the insertion direction, there is a possibility that the liquid cartridge may be skewed due to generation of a rotational force in loading.

Thus, according to the cartridge loading/unloading device of the above construction, since the cartridge holding mechanism includes the integral engaging member which is engaged with the front side of one surface of the ink cartridge in its loading direction across the center of the one surface, even in a case where the integral engaging member is intended to be engaged with an ink cartridge in plural places, there is no possibility that the engaging member may be engage with the ink cartridge only in one place. That is, since the engaging member is integral, the engaging member always is engaged with the ink cartridge in all places or does not engage with the ink cartage at all.

Further, since the engaging member is engaged with the front side of one surface of the ink cartridge in its loading direction across the center thereof, even if the engaging member is engaged with the ink cartridge only in one place, the engaging member can be allowed to be engaged with the portion of the ink cartridge in a position near the center of gravity of the cartridge in a direction vertical to the insertion direction. As a result, it is possible to suppress generation of a rotational force and it is also possible to reliably push in and load the ink cartridge. Moreover, since the engaging member is allowed to be engaged with the front side of an ink cartridge in its loading direction, it is possible to hold the vicinities of the liquid supply ports into which the ink supply needles are inserted, respectively. Accordingly, the vicinities of the liquid supply ports can be held, whereby the ink supply needles can be inserted reliably.

Moreover, a relatively large leverage can be obtained by using the lever arm which can take a relatively long distance between a point of action and a fulcrum. Therefore, since a large push-in force can be obtained with a very small force using the principle of the lever, even a single package type ink cartridge can be loaded and taken out easily.

In addition, in the cartridge loading/unloading device of the above construction, it is preferable that the power transmission converting mechanism be adapted to move the liquid cartridge by the second predetermined stroke.

According to the cartridge loading/unloading device of such a construction, since the power transmission converting mechanism can be adapted to move an ink cartridge by the second predetermined stroke, the power transmission converting mechanism can be made a simple structure.

Moreover, in the cartridge loading/unloading device of the above construction, it is preferable that the power transmission converting mechanism be adapted to move a flow passage unit including needles to be inserted into the ink cartridge by the second predetermined stroke.

According to the cartridge loading/unloading device of such a construction, since the power transmission converting mechanism of this embodiment can be adapted to move the flow passage unit including the needles to be inserted into the ink cartridge by the second predetermined stroke, it is not necessary to move a heavy ink cartridge. That is, when an ink cartridge is loaded, the ink cartridge in which ink is fully contained is heavy. Therefore, an ink cartridge can be loaded with a smaller force by moving the flow passage unit including the needles.

Further, the above object of the present invention is achieved by a recording apparatus including a liquid cartridge loading/unloading device which allows a liquid cartridge to be slid and loaded on a recording apparatus body. The liquid cartridge loading/unloading device is the above-mentioned liquid cartridge loading/unloading device.

According to the recording apparatus of the above construction, since the recording apparatus includes the above-mentioned liquid cartridge loading/unloading device, the same effects as those of the liquid cartridge loading/unloading device can be obtained.

Further, the above object of the present invention is achieved by a liquid ejection apparatus including: a liquid cartridge loading/unloading device which allows a liquid cartridge to be slid and loaded on a liquid ejection apparatus body. The apparatus has a cartridge holding mechanism which holds the liquid cartridge when the liquid cartridge is inserted by a first predetermined stroke, and a power transmission converting mechanism which ensures a push-in force required for loading of the ink cartridge using the principle of the lever by the rotational motion of a lever arm, and which converts the rotational motion of the lever arm into a second predetermined stroke of movement required for loading of the ink cartridge in a state in which it is held by the cartridge holding mechanism. The cartridge holding mechanism includes an integral engaging member which is engaged with the front side of one surface of the ink cartridge in its loading direction across the center of the one surface.

According to the liquid ejection apparatus of the above construction, the same effect as that of the liquid cartridge loading/unloading device can be obtained.

According to the liquid cartridge of the present invention, for example, when a plurality of engaging recesses or a plurality of abutting parts are provided across a central portion of the container body, the spacing between the engaging recesses or abutting parts can be narrowed compared with the conventional ink cartridge which has the engaging recesses in both the right and left side surfaces of a container body.

Thus, the liquid cartridge of the present invention is hardly inclined at the time of cartridge mounting compared with the conventional ink cartridge, whereby skew insertion of the ink cartridge is prevented.

Accordingly, an ink cartridge can be reliably loaded by preventing skew insertion thereof when the cartridge is inserted into the cartridge mounting section of the liquid consuming apparatus by sliding operation of the cartridge loading/unloading device, and occurrence of troubles the liquid leakage resulting from the erroneous loading by skew insertion, etc. can be prevented.

Moreover, according to the liquid cartridge loading/unloading device, recording apparatus, and liquid ejection apparatus of the present invention, it is possible to suppress generation of a rotational force and it is also possible to reliably push in and load the ink cartridge. Moreover, since the engaging member is allowed to be engaged with the front side of an ink cartridge in its loading direction, it is possible to hold the vicinities of the liquid supply ports into which the ink supply needles are inserted, respectively. Accordingly, the vicinities of the liquid supply ports can be held, whereby the ink supply needles can be inserted reliably.

Moreover, a relatively large leverage can be obtained by using the lever arm which can take a relatively long distance between a point of action and a fulcrum. Therefore, since a large push-in force can be obtained with a very small force using the principle of the lever, even a single package type ink cartridge can be loaded and taken out easily.

The present disclosure relates to the subject matter contained in Japanese patent application Nos. 2005-091531 (filed on Mar. 28, 2005) and 2006-84818 (filed on Mar. 27, 2006), each of which is expressly incorporated herein by reference in its entirety.

BRIEF DESCRIPTION OF THE DRAWINGS

FIG. 2A is a view showing the whole ink cartridge loading/unloading device, and FIG. 2B is a view showing a rotary slide portion in FIG. 2A.

BEST MODE FOR CARRYING OUT THE INVENTION

Hereafter, preferred embodiments of a liquid cartridge, a liquid cartridge loading/unloading device, a recording apparatus, and a liquid ejection apparatus according to the invention will be described in detail with reference to the accompanying drawings.

Figure 1:
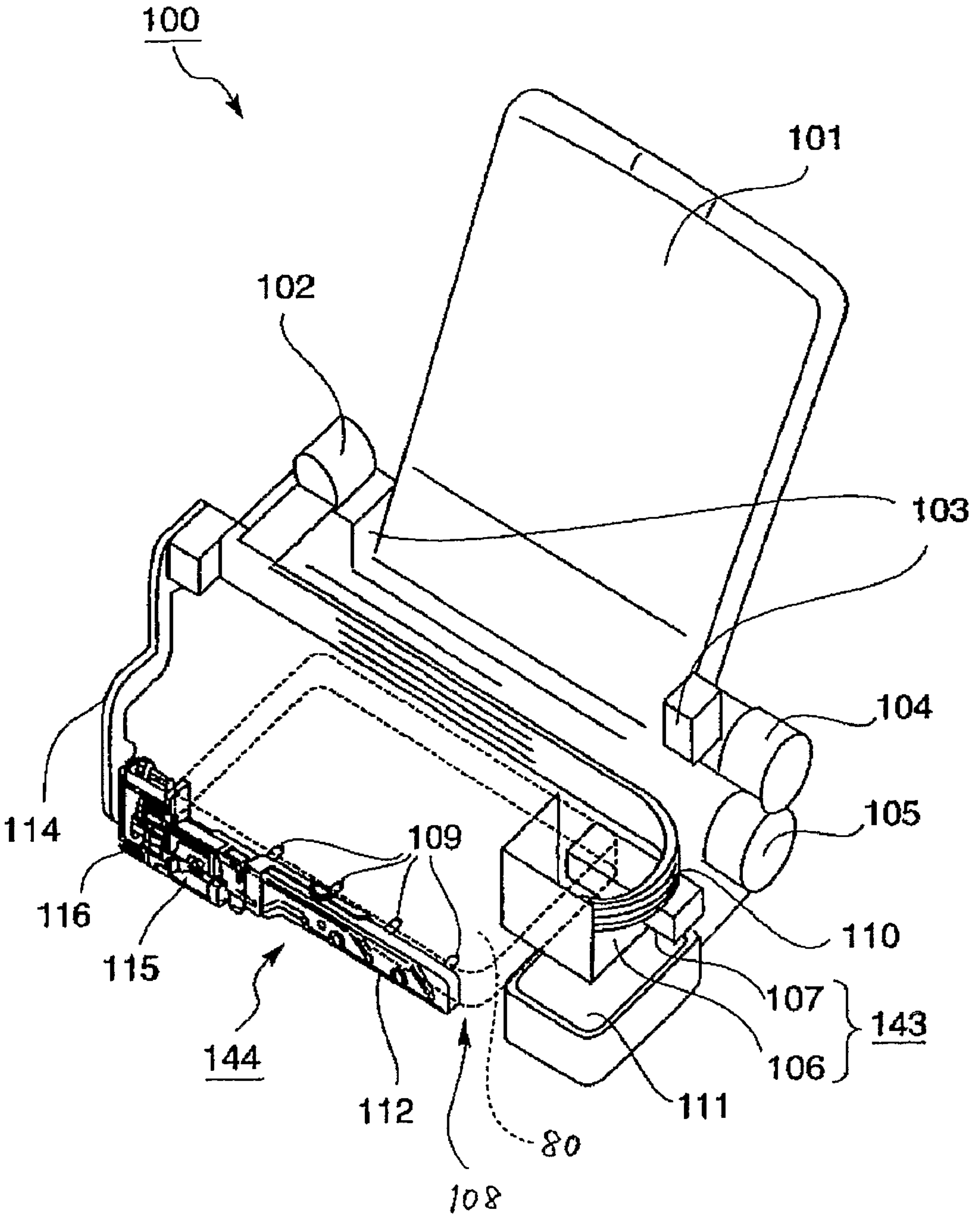
FIG. 1 is an overall perspective view showing the interior of liquid consuming apparatus equipped with liquid cartridge according to the present invention.

FIG. 1 is an overall perspective view showing the interior of an ink jet printer that is an example of the recording apparatus and the liquid ejection apparatus as liquid consuming apparatuses according to the invention.

A sheet feed cassette 101 on which sheets as recording material are stacked is detachably provided on the back side of a main body of the ink jet printer 100 shown in FIG. 1.

The sheet stacked at the uppermost position of the sheet feed cassette 101 is taken up by a feeding roller (not shown) driven by a feeding motor 104, and fed to a conveying roller (not shown) on the downstream side in a conveying direction while it is guided by a sheet guide 103.

The sheet which has been fed to the conveying roller is further conveyed by a conveying roller driven by a conveying motor 105 to a recording section 143 on the downstream side in a conveying direction.

The recording section 143 has a platen (not shown) which supports a sheet from below and a carriage 106 disposed so as to face the top side of the platen.

The carriage 106 of recording section 143 is driven by a carriage motor 102 while it is guided by a carriage guide shaft (not shown) extending in a main scanning direction. Moreover, a bottom part 131 of the carriage 106 is provided with a recording head 107 which discharges ink toward a sheet.

The sheet recorded by the recording section 143 is further conveyed toward the downstream side, and is ejected from the front side of the ink jet printer 100 by a sheet ejection roller (not shown).

Further, a cartridge mounting section 108 set below the main body of the ink jet printer 100 is loaded with an ink cartridge 80 that is liquid cartridge according to the invention, and ink is supplied to an ink supply passage 144 via ink supply needles (needles) 109 that are ink supply portions of the cartridge mounting section 108.

Specifically, ink is first supplied to a first ink supply passage module 112. The first ink supply passage module 112 is provided with a valve unit 115 which can cut off supply of ink. The valve unit 115 is adapted such that a valve (not shown) can be opened and closed via a gear unit 116 by, for example, the power of the conveying motor 105.

Subsequently, the ink which has passed through a valve in the first ink supply passage module 112 is supplied to a second ink supply passage module 114, and is further supplied to the recording head 107 of the carriage 106 via ink supply tubes 110.

And, at the time of cleaning of the recording head 107, discharge and suction operations of ink are performed in a capping device 111 provided on one side.

Figure 2A:
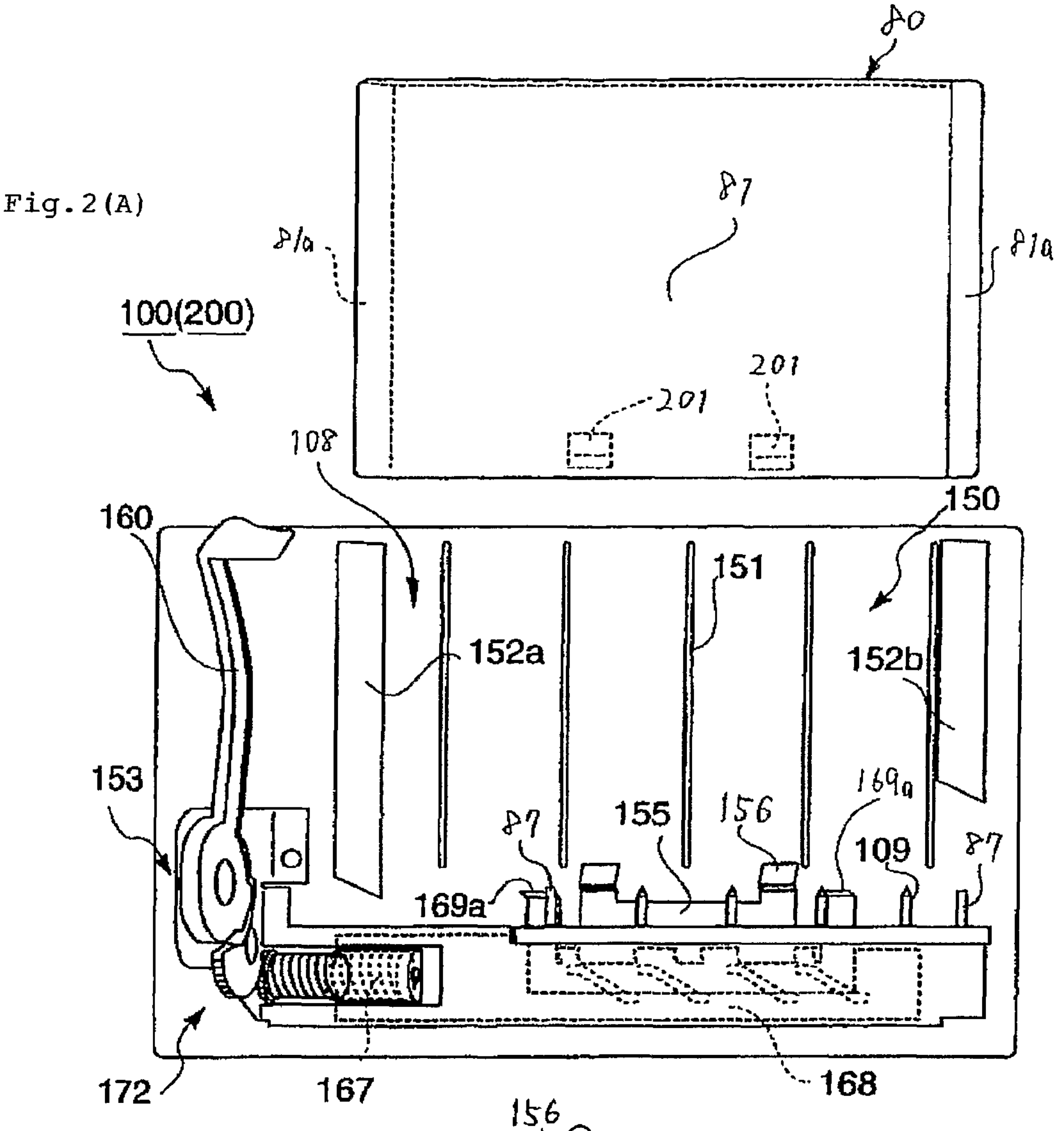
FIGS. 2A and 2B are top perspective views of a cartridge loading/unloading device in the liquid consuming apparatus shown in FIG. 1.
Figure 2B:
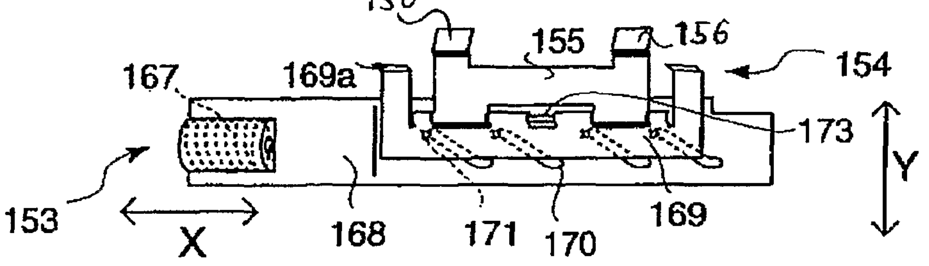

FIGS. 2A and 2B show top perspective views of an ink cartridge loading/unloading device (cartridge loading/unloading device) 200 with which the cartridge mounting section 108 of the ink jet printer 100 according to the invention is equipped. FIG. 2A shows the whole ink cartridge loading/unloading device, and FIG. 2B shows only a rotary slide portion in FIG. 2A.

A main frame 150 of the ink jet printer 100 is provided with guide ribs 151 which, when an ink cartridge 80 is inserted, support the ink cartridge 80 from below. The main frame is also provided with guides 152*a* and 152*b* which, when an ink cartridge 80 is inserted, abuts against side surfaces 81*a* of a container body 81 of the ink cartridge 80 to regulate the ink cartridge 80 in a right-and-left width direction.

Further, the ink cartridge loading/unloading device 200 according to this embodiment includes a lever arm 160, a power transmission converting mechanism 153, and a cartridge holding mechanism 154. Among them, the power transmission converting mechanism 153 includes a driving transmission member 172, a first slide member 168, and a second slide member 169. Further, the cartridge holding mechanism 154 includes an engaging member 155.

A lever arm 160 operated by a user at the time of loading/unloading of an ink cartridge 80 is provided on the left side of the drawing. This lever arm 160 transmits power to a female threaded portion 167 via the driving transmission member 172 as will be described below to move the first slide member 168 in a main scanning direction X (the same as a longitudinal direction in an ink cartridge insertion surface). At this time, the first slide member 168 is regulated so that it may be moved only in the main scanning direction X by a first slide guide (not illustrated).

The first slide member 168 is provided with slide grooves 170 which are engaged with corresponding slide pins 171 provided in the second slide member 169. The slide pins 171 are adapted to be freely movable within the corresponding slide grooves 170.

The second slide member 169 is formed with cartridge abutting parts 169*a* which, when an ink cartridge 80 has been inserted by a first predetermined stroke, abut against the ink cartridge 80.

Further, the second slide member 169 is rotatably connected with the engaging member 155 by a pivot 173. The engaging member 155 is formed with claws 156 which are engageable with an ink cartridge 80. Here, the engaging member 155 and the second slide member 169 are regulated by a second slide guide that is not illustrated so as to be moved only in an insertion direction Y of an ink cartridge 80. That is, the slide grooves 170 and the slide pins 171 serve to convert the motion of the first slide member 168 in the main scanning direction X into the motion of the second slide member 169 in the ink cartridge insertion direction Y.

Hereafter, after the construction of the ink cartridge 80 of this embodiment is described with reference to FIGS. 3 to 8, each part of the ink cartridge loading/unloading device 200 will be described in detail.

Figure 3:
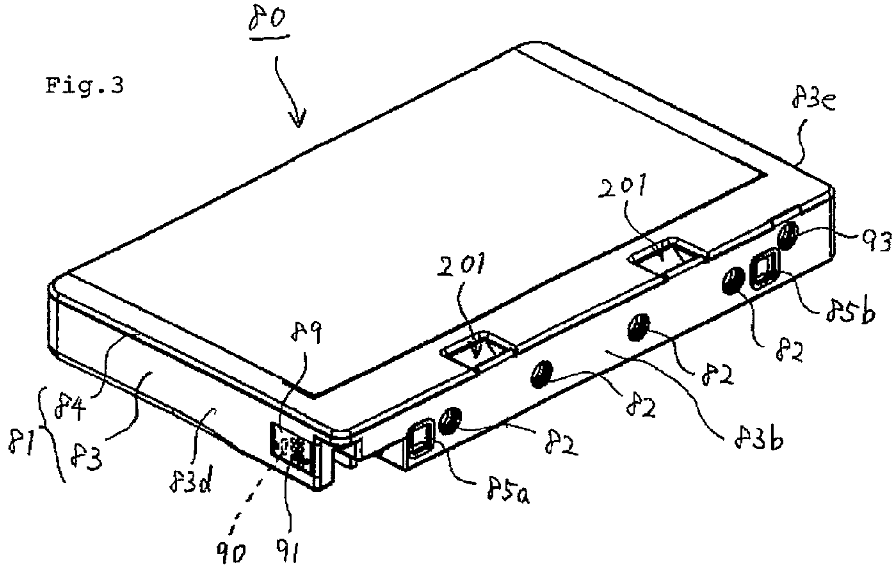
FIG. 3 is an overall perspective view of the ink cartridge mounted on the cartridge mounting section of FIG. 2 when it is seen from the leading top side in the insertion direction.
Figure 4:
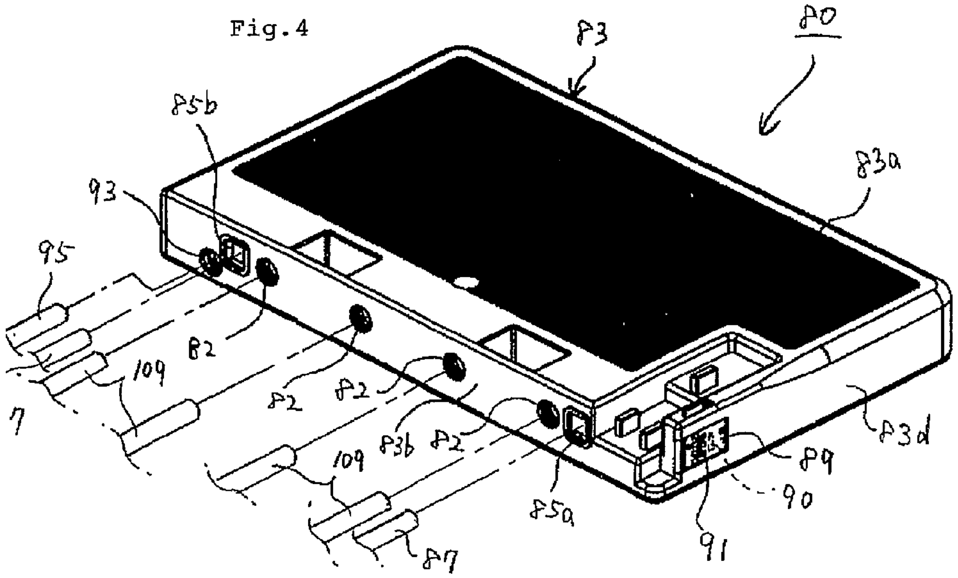
FIG. 4 is an overall perspective view of the ink cartridge mounted on the cartridge mounting section of FIG. 2 when it is seen from the leading bottom side in the insertion direction.
Figure 5:
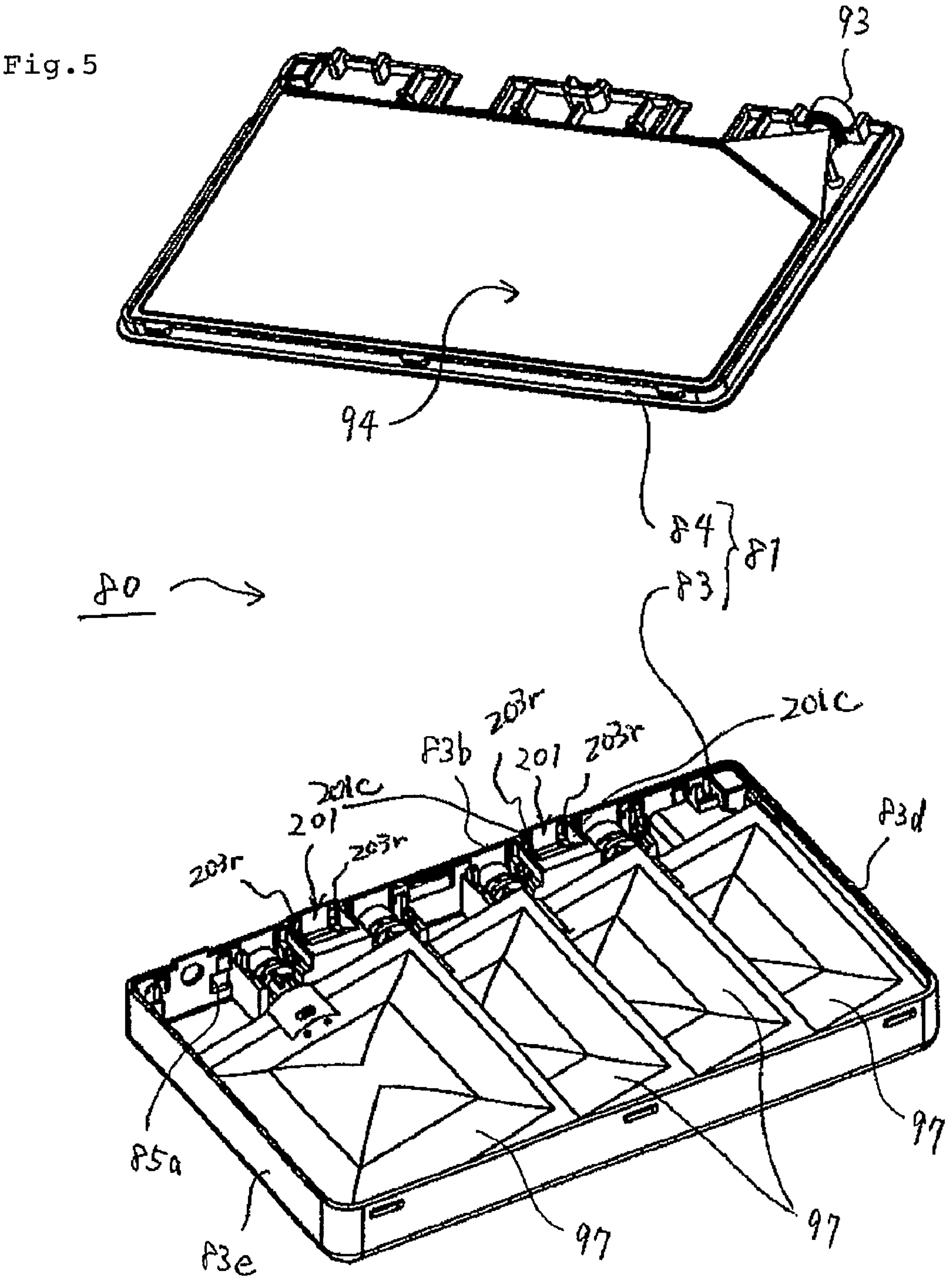
FIG. 5 is an exploded perspective view of the ink cartridge shown in FIG. 3.
Figure 6B:
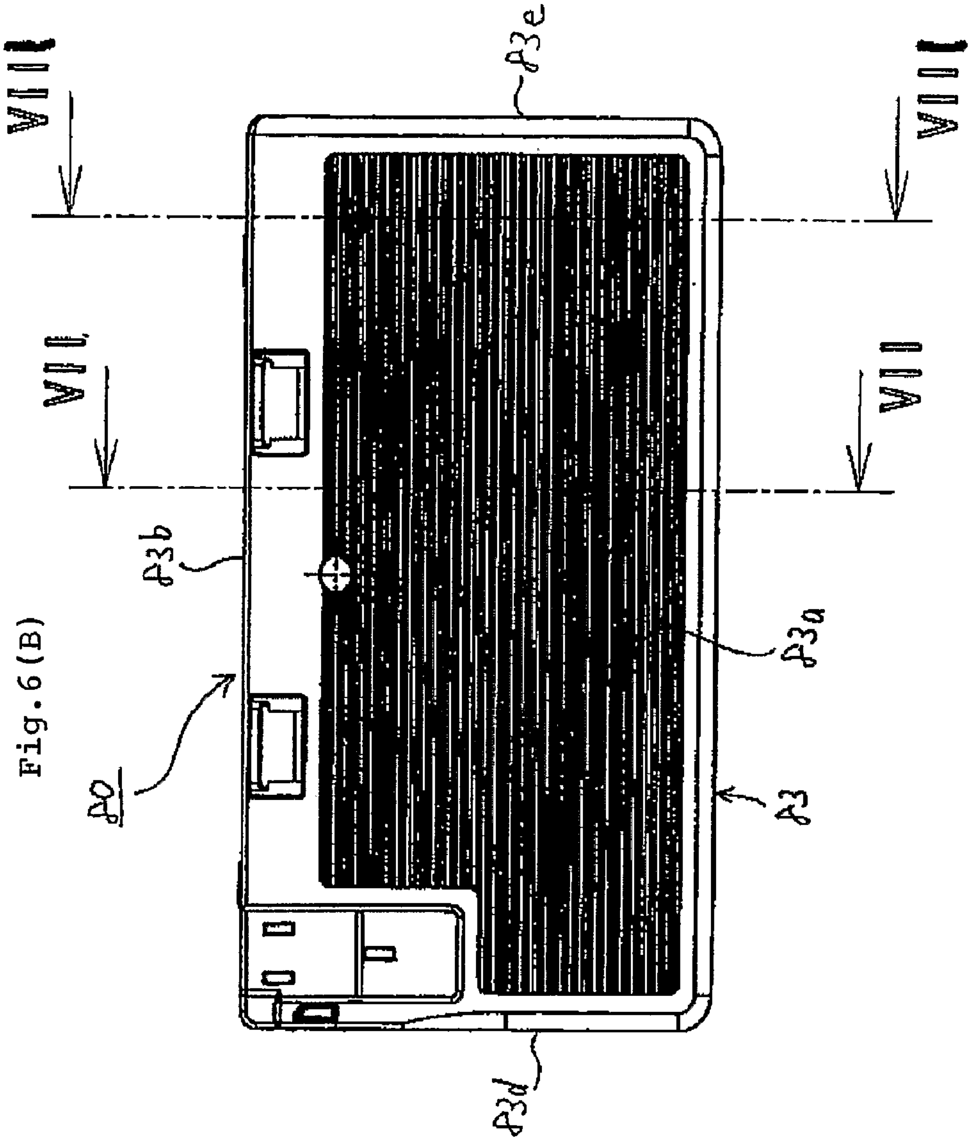
FIGS. 6A and 6B are respectively a side view and a top view of the ink cartridge shown in FIG. 3.
Figure 6A:
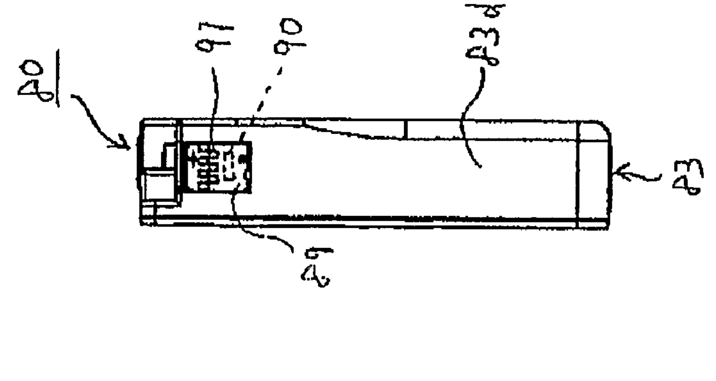
Figure 7:
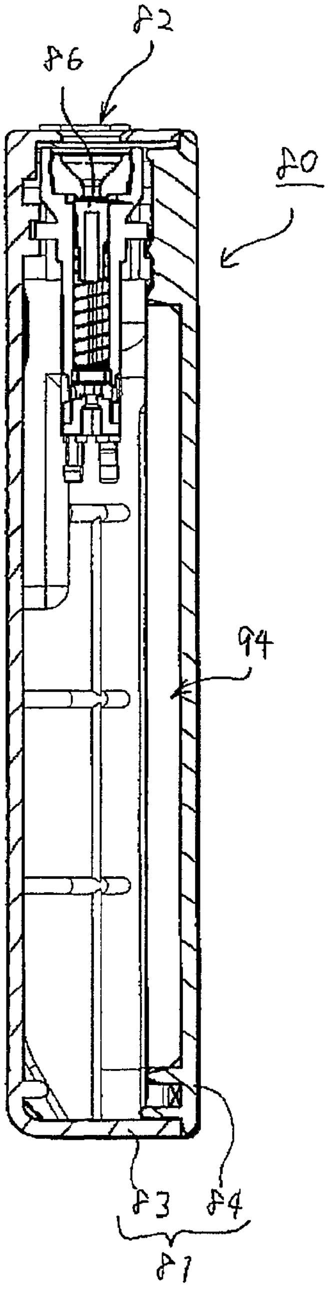
FIG. 7 is a sectional view as seen in the direction of the arrow VII-VII of FIG. 6B.
Figure 8:
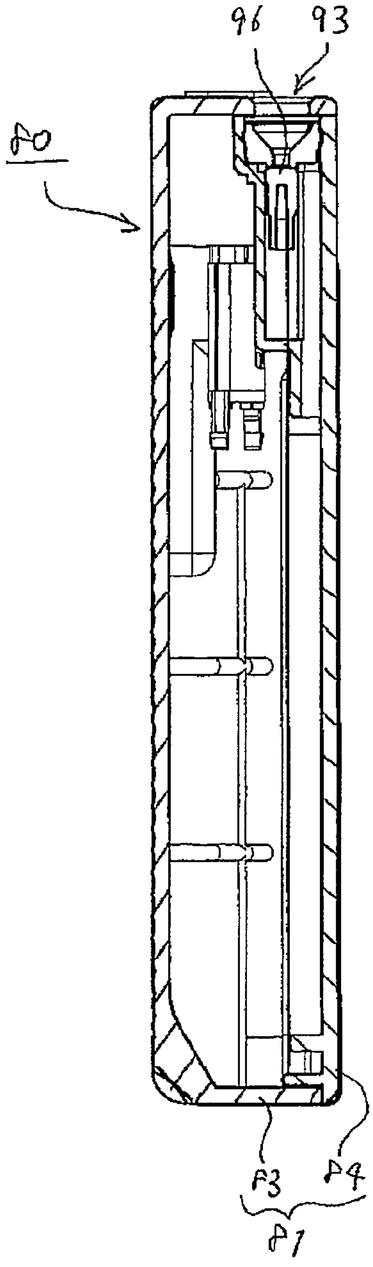
FIG. 8 is a sectional view as seen in the direction of the arrow VII-VIII of FIG. 6B.

FIG. 3 is an overall perspective view of the ink cartridge adapted to be mounted on the cartridge mounting section of FIG. 2 when it is seen from the top side and the insertion direction leading end side, FIG. 4 is an overall perspective view of the ink cartridge adapted to be mounted on the cartridge mounting section of FIG. 2 when it is seen from the bottom side and the insertion direction leading end side, FIG. 5 is an exploded perspective view of the ink cartridge shown in FIG. 3, FIGS. 6A and 6B are respectively a side view and a top view of the ink cartridge shown in FIG. 3, FIG. 7 is a sectional view as seen in the direction of the arrow VII-VII of FIG. 6B, and FIG. 8 is a sectional view as seen in the direction of the arrow VII-VIII of FIG. 6B.

The ink cartridge 80 of this embodiment, as shown in FIG. 3 and FIG. 6, includes the container body 81 in the shape of a flat rectangular parallelepiped which is detachably mounted to the cartridge mounting section 108 by the ink cartridge loading/unloading device 200, and a plurality of (four in this embodiment) liquid supply ports 82, provided at the leading end side of the container body 81 in the insertion direction, for supplying liquid to the ink supply passage 144 provided in the cartridge mounting section 108.

The container body 81, as shown in FIG. 5, is a container in the shape of a flat rectangular parallelepiped formed by a pair of upper and lower cases 83 and 84, and each of the cases 83 and 84 is formed by injection molding of resin.

The lower case 83 is formed in the shape of a box with its top surface open, and the lower case is formed by a bottom wall 83*a*, a front wall 83*b* which is erected vertically at a front end of the bottom wall 83*a* which becomes the leading end of this bottom wall 83*a* in the insertion direction into the cartridge mounting section 108, a rear wall 83*c* which is erected vertically at a rear end of the bottom wall 83*a*, and right and left side walls 83*d* and 83*e* which are erected vertically at the right and left ends of the bottom wall 83*a*.

The upper case 84 serves as a top cover (lid body) which covers the top open portion in the lower case 83.

The container body 81 of this embodiment accommodates a plurality of (four in this embodiment) ink packs (liquid reservoir packs) 97 which stores the ink liquid to be supplied to the recording head 107 of the ink jet printer 100. And, the plurality of liquid supply ports 82 mentioned above are arranged corresponding to the accommodated positions of the respective ink packs 97.

The liquid supply ports 82, as shown in FIG. 3, are arranged along the front wall 83*b* of the lower case 83 where its surface becomes the leading end surface of the container body 81 in the insertion direction. As shown in FIG. 7, a valve mechanism 86 which opens and closes a flow passage by insertion of each ink supply needle 109 of the cartridge mounting section 108 is provided in each liquid supply port 82.

The ink supply needles 109 as ink supply portions of the cartridge mounting section 108 are connected to the recording head 107 via the ink supply passage 144 shown in FIG. 1.

Further, this front wall 83*b* is provided with a pair of positioning holes 85*a* and 85*b* that are positioning means which position the container body 81 in a predetermined position when a cartridge is inserted into the cartridge mounting section 108. In this embodiment, if an ink cartridge 80 is inserted into the cartridge mounting section 108 by a predetermined distance, as shown in FIGS. 3 and 4, positioning pins 87 formed on the cartridge mounting section 108 fit into the pair of positioning holes 85*a* and 85*b*, whereby the ink cartridge is positioned.

The plurality of liquid supply ports 82 mentioned above are located and provided between the pair of positioning holes 85*a* and 85*b*.

Further, the pair of positioning holes 85*a* and 85*b* is provided in the positions near both ends of the front wall 83*b*.

And, the leading end of the one side wall 83*d* orthogonal to the front wall 83*b* is equipped with a circuit board 89. A memory element 90 which stores various kinds of information, such as the residual amount of ink, is mounted on the back side of this circuit board 89 and this circuit board 89 is formed on its opposite, surface side with a connecting terminal 91 used as an input/output terminal to the memory element 90.

This circuit board 89 is disposed so that the surface of the connecting terminal 91 may be approximately flush with the surface of the side wall 83*d*. When the cartridge mounting section 108 is appropriately loaded with the ink cartridge 80, the connecting terminal 91 contacts an electric connector (not shown) provided on the cartridge mounting section 108, so that information can be read from and written into the memory element 90 by a control circuit of the ink jet printer 100.

A waste liquid collection port 93 for collecting waste into the container body 81 is provided in a position in the vicinity of the end of the front wall 83*b* opposite to the side equipped with the connecting terminal 91 and in proximity to the positioning hole 85*b* outside the positioning hole 85*b*.

As shown in FIGS. 5 and 8, a waste liquid collection chamber 94 which communicates with the waste liquid collection port 93 is partitioned along the inner surface of the upper case 84 within the container body 81. This waste liquid collection chamber 94 is loaded with an absorbing material which adsorbs waste ink to prevent backflow of the waste ink collected in the waste liquid collection chamber 94.

If an ink cartridge 80 is mounted on the cartridge mounting section 108, a waste ink supply needle 95 (refer to FIG. 4) of the cartridge mounting section 108 is fitted into the waste liquid collection port 93, to supply the waste ink generated in a cleaning treatment, etc. of the recording head 107 to the waste liquid collection chamber 94 via the waste ink supply needle 95.

In addition, the waste liquid collection port 93, as shown in FIG. 8, is equipped with a sealing mechanism 96 which seals between itself and the waste ink supply needle 95 inserted into the waste liquid collection port 93.

In the case of the container body 81 of this embodiment, the top surface (outer surface of the upper case 84) orthogonal to the front wall 83*b* of the lower case 83 provided with the liquid supply ports 82, as shown in FIG. 3, is provided with a pair of engaging recesses 201 which are to be engaged with the pair of claws 156 of the engaging member 155 of the ink cartridge loading/unloading device 200.

Each engaging recess 201 is a recess corresponding to the shape of each claw 156. More specifically, the part of the recess 201 corresponding to a tapered leading end 156*a* of the claw 156 is formed in an inclined plane 201*a*. Further, the part of the engaging recess 201 corresponding to an engaging part 156*b* of the claw 156 is formed with an abutting part 203 formed in a front wall surface 201*b* of the engaging recess 201 in the insertion direction. That is, the lower case 83 is a case positioned with respect to the cartridge mounting section 108, and the front wall 83*b* of this lower case 83 is provided with the abutting parts 203.

Figures 11A, 11B, 11C, 11D:
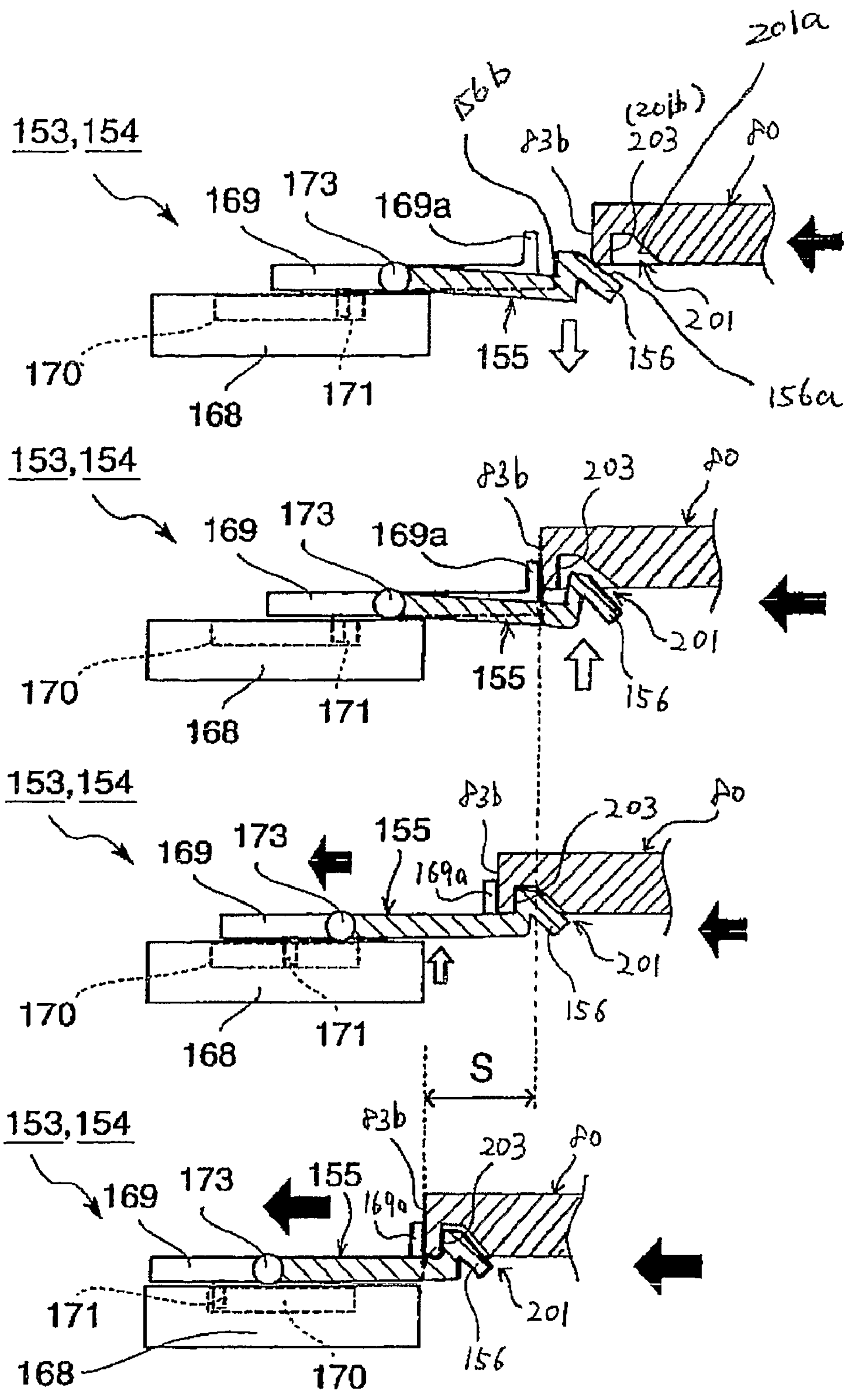
FIGS. 11A to 11D are sectional side views showing the operation at the time of insertion and loading of the cartridge holding member shown in FIG. 10.

As for the abutting part 203, when an ink cartridge 80 is inserted into the cartridge mounting section 108 by a predetermined distance, as shown in FIG. 11C, the engaging part 156*b* of the claw 156 faces the surface of the abutting part 203, and the container body 81 is moved in a cartridge mounting direction by being pressed and urged toward the insertion direction of a cartridge by the claw 156.

In the case of this embodiment, the pair of engaging recesses 201 is provided near the surface of the front wall 83*b* which is the leading end surface of the container body 81 in the insertion direction.

Moreover, the pair of engaging recesses 201 are disposed near the pair of positioning holes 85*a* and 85*b* which positions the container body 81 with respect to the cartridge mounting section 108, and between the pair of positioning holes 85*a* and 85*b*.

And, in this embodiment, the position of the abutting part 203 in the height direction is disposed near a horizontal plane passing through the centers of the pair of positioning holes 85*a* and 85*b*.

The abutting part 203 may be formed by the front wall surface 201*b* of the engaging recess 201 per se. Alternatively, the abutting part 203 may be formed by a protrusion(s) or rib(s) formed on the front wall surface 201*b* of the engaging recess 201. For example, as shown in FIG. 5, the abutting part 203 in this embodiment is formed by a pair of protrusions or ribs 203*r* that are formed on the front wall surface 201*b* of the engaging recess 201 and that are located near both side walls 201*c* of the engaging recess 201.

Next, the construction and operation of the respective parts of the ink cartridge loading/unloading device 200 which are used when detaching and attaching the ink cartridge 80 to the cartridge mounting section 108 are described in detail.

Figure 9A:
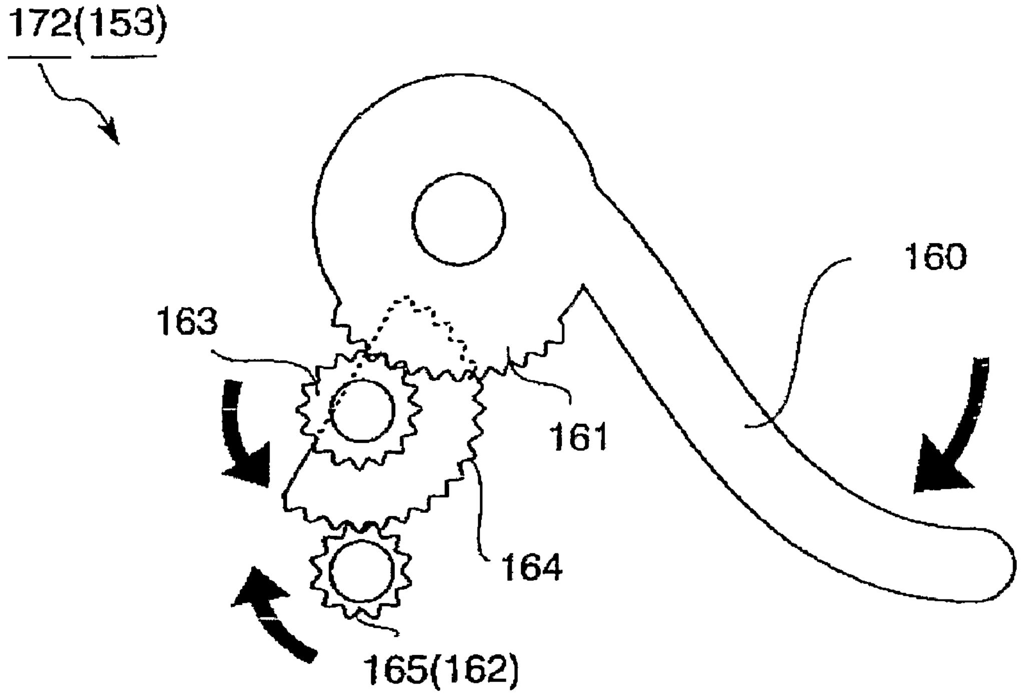
FIG. 9A is a side view of a power transmission portion in the cartridge mounting section.
Figure 9B:
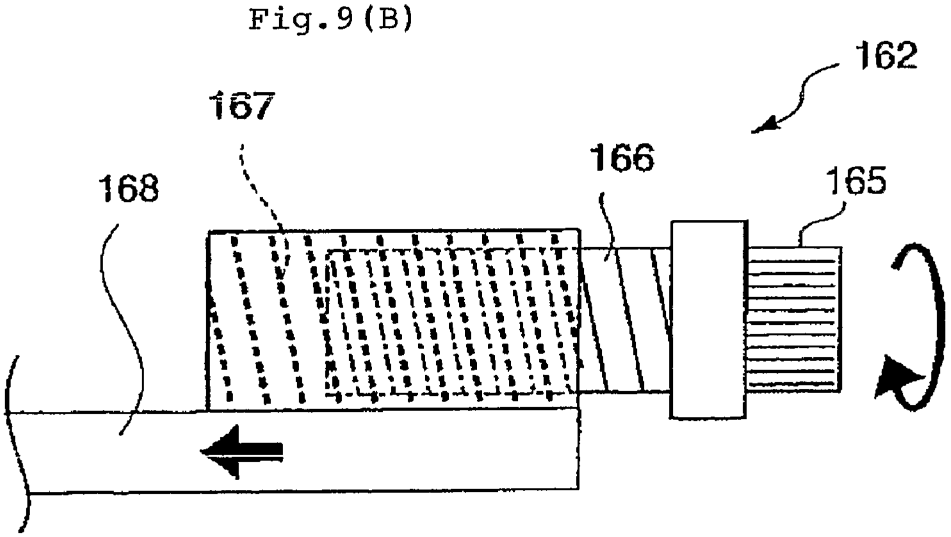
FIG. 9B is a front view of the power transmission portion from the power transmission portion to the first slide member.

FIG. 9A is a side view of the power transmission portion by the power transmission converting mechanism 153 according to the invention, and FIG. 9B is a front view of the power transmission portion from the power transmission portion to the first slide member 168.

As shown in FIG. 9A, a first gear 161 is formed on a base end of a lever arm 160, and when the lever arm 160 rotates, power is transmitted to a second gear 163 via the first gear 161. The power of the second gear 163 is transmitted to a fourth gear 165 via a third gear 164 formed integrally with the second gear.

As shown in FIG. 9B, a unit gear 162 is constructed by the fourth gear 165 and a worm gear 166. Accordingly, the power transmitted to the fourth gear 165 is transmitted to a female threaded portion 167 provided in the first slide member 168 via the worm gear 166 formed integrally with the fourth gear. That is, a rotary motion can be converted into a reciprocating motion in the main scanning direction by the worm gear 166 and the female threaded portion 167.

Figure 10:
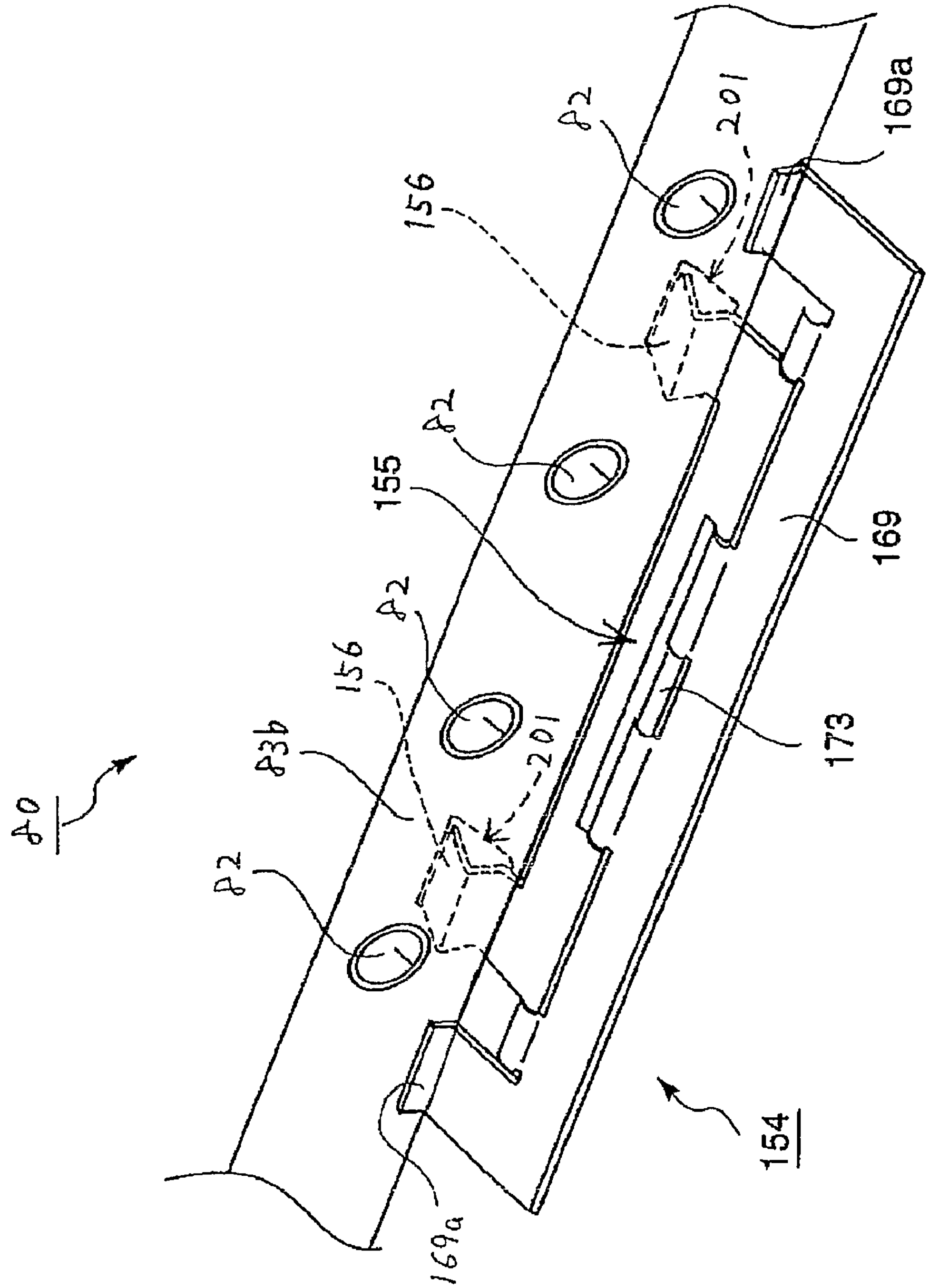
FIG. 10 is a perspective view showing a cartridge holding member with which the cartridge mounting section is equipped.

FIG. 10 is an enlarged perspective view showing the cartridge holding mechanism 154 in a state in which an ink cartridge 80 is inserted and engaged with the engaging member 155, i.e., a state in which the cartridge is held by the cartridge holding mechanism 154.

The claws 156 of the engaging member 155 are engageable with the corresponding engaging recesses 201 provided near the liquid supply ports 82 of the ink cartridge 80. Further, the cartridge abutting parts 169*a* of the second slide member 169 are provided to abut against the surface of the front wall 83*b* of the lower case 83 when an ink cartridge 80 is inserted.

Since the engaging member 155 extends in the shape of the letter "U" in the longitudinal direction X of the ink cartridge 80, there is no possibility that only one claw 156 may be engage with the engaging recess 201 of the ink cartridge 80.

That is, both the claws engage with the engaging recesses in two places simultaneously, or neither claws engage with the engaging recesses.

Moreover, the cartridge abutting parts 169*a* of the second slide member 169 are formed in the shape of the letter "U" in the longitudinal direction X of the ink cartridge 80, and are provided so as to abut against the ink cartridge 80 outside the engaging member 155. Accordingly, when an ink cartridge 80 is inserted in a skew state, the front wall 83*b* abuts against any one of the cartridge abutting parts 169*a* and stops without engaging with the engaging member 155, or is further inserted and abuts against the other cartridge abutting parts 169*a*. That is, the front wall abuts against both the cartridge abutting parts 169*a* and is engaged with both the claws 156 of the engaging member 155, or does not engage with any one of the claws.

FIGS. 11A to 11D are sectional side views showing operation aspects of the cartridge holding mechanism 154 according to the invention. Among them, FIG. 11A is a sectional side view showing a state in the course of insertion of an ink cartridge, FIG. 11B is a sectional side view showing the completion of the insertion, FIG. 11C is a sectional side view showing a state in the course of loading of an ink cartridge, and FIG. 11D is a sectional side view showing a state of the completion of the loading.

First, as shown in FIG. 11A, if an ink cartridge 80 is inserted in the direction of the arrow, the lower end of the front wall 83*b* abuts against the claws 156 of the engaging member 155 and pushes them down. That is, as the engaging member 155 inclines, the claws 156 can retreat slightly downwardly.

Subsequently, since the engaging recesses 201 pass by the claws 156 if the ink cartridge 80 is further inserted in the direction of the arrow as shown in FIG. 11B, the claws 156 moves upwards slightly, and the claws 156 engage with the engaging recesses 201 shallowly with a click. This state is a state in which the ink cartridge 80 is held by the cartridge holding mechanism 154, i.e., a state of completion of insertion of the ink cartridge 80 which has been inserted by a first predetermined stroke.

Moreover, as shown in FIG. 11C, if a user rotates the lever arm 160, as mentioned above, the first slide member 168 makes a motion in the main scanning direction, while the second slide member 169 makes a motion in the ink cartridge insertion direction Y. Here, if the second slide member 169 begins to move in the direction of the arrow, the connected engaging member 155 abuts against the top surface of the first slide member 168 so as to be pushed up, whereby the claws 156 engage with the engaging recesses 201 more deeply. Moreover, along with this deep engagement, the ink cartridge 80 is pressed and moved in the insertion direction Y of the ink cartridge 80.

And, FIG. 11D shows a state in which movement of the second slide member 169 has finished by a second predetermined stroke S along with an ink cartridge 80, i.e., a completion state of ink cartridge loading.

The operation of FIGS. 11A to 11D will be described below along with FIGS. 12 to 14 showing the whole operation.

Figures 12A, 12B:
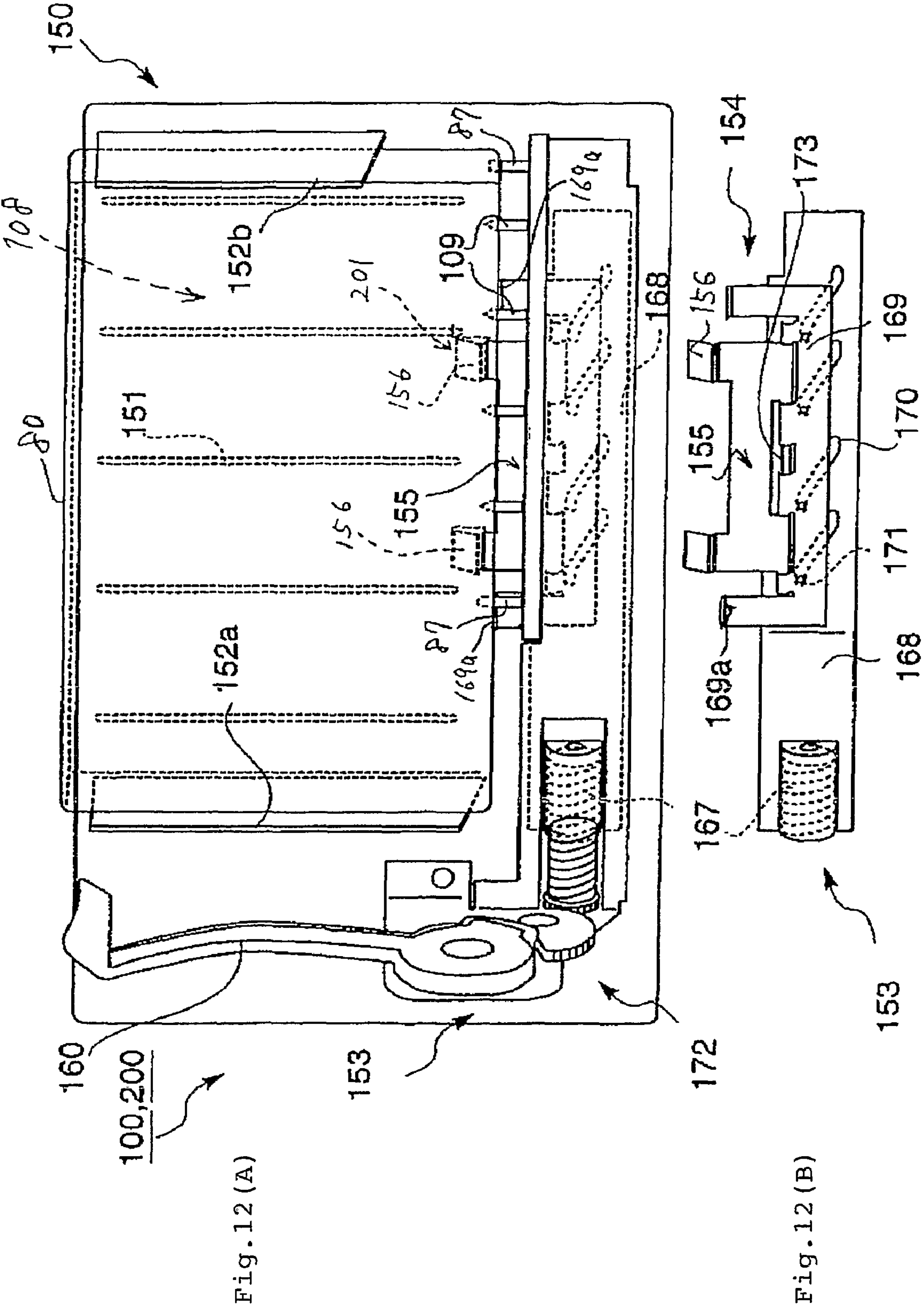
FIG. 12A is a top perspective view showing a state before cartridge loading after the completion of insertion of a cartridge in the cartridge loading/unloading device.
FIG. 12B is a view showing only a rotary slide portion in FIG. 12A.

FIG. 12A is a top perspective view showing a state before cartridge loading after the completion of insertion of a cartridge in the cartridge loading/unloading device 200, and FIG. 12B is a view showing only a rotary slide portion in FIG. 12A.

As shown in FIG. 12A, an ink cartridge 80 is inserted into the cartridge mounting section 108, and as shown in FIG. 11B, is engaged with and held by the engaging member 155.

Figure 13A:
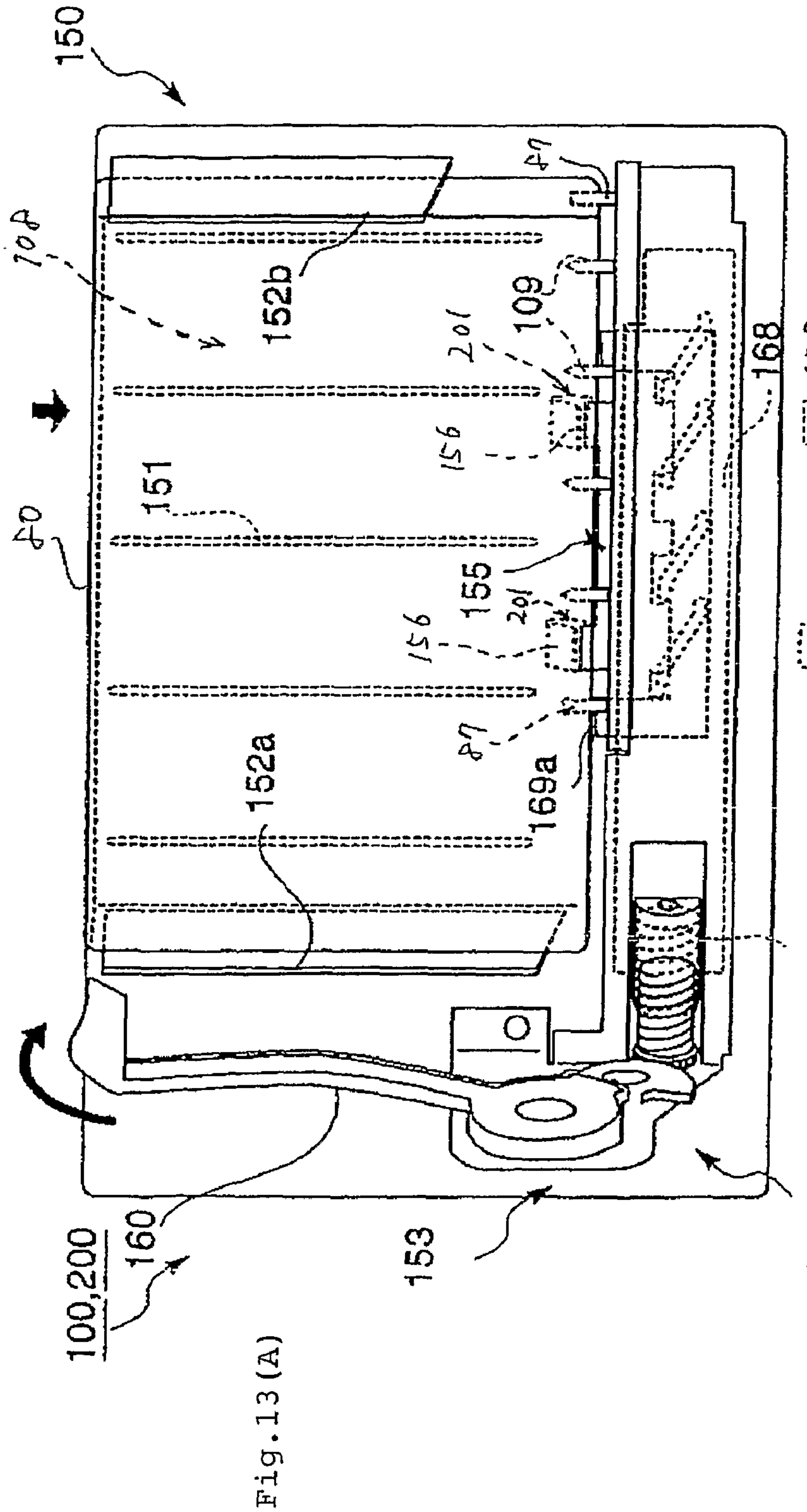
FIG. 13A is a top perspective view showing a state in the course of loading of a cartridge in the cartridge loading/unloading device.
Figure 13B:
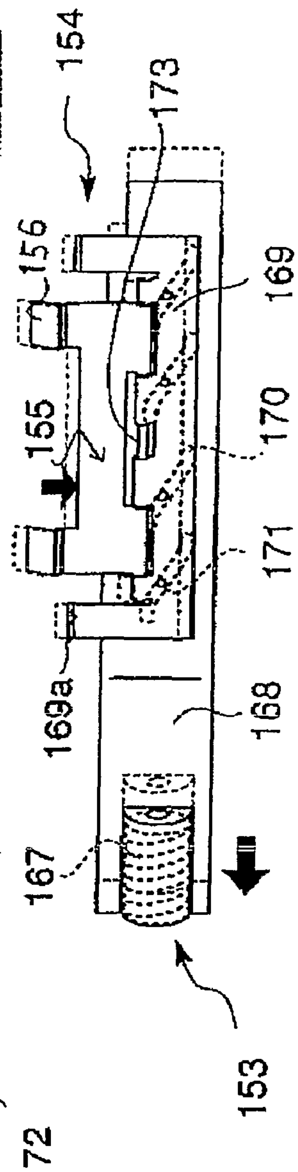
FIG. 13B is a view showing only the rotary slide portion in FIG. 13A.

FIG. 13A is a top perspective view showing a state in the course of loading of a cartridge in the cartridge loading/unloading device 200, and FIG. 13B is a view showing only the rotary slide portion in FIG. 13A.

As shown in FIG. 13A, if a user rotates the lever arm 160 in the direction of the arrow, the rotary motion of the lever arm 160 is converted into a reciprocating motion in the main scanning direction of the first slide member 168 by the aforementioned driving transmission member 172.

Since the slide pins 171 are regulated by the slide grooves 170 if the first slide member 168 moves in the direction of the arrow, the second slide member 169 is moved in the direction of the arrow. At this time, since the claws 156 of the engaging member 155 are engaging with the engaging recesses 201, as shown in FIG. 11C, the ink cartridge 80 can be moved in the insertion direction Y (refer to FIG. 2). Accordingly, the ink supply needles 109 can be inserted into the liquid supply ports 82.

Figures 14A, 14B:
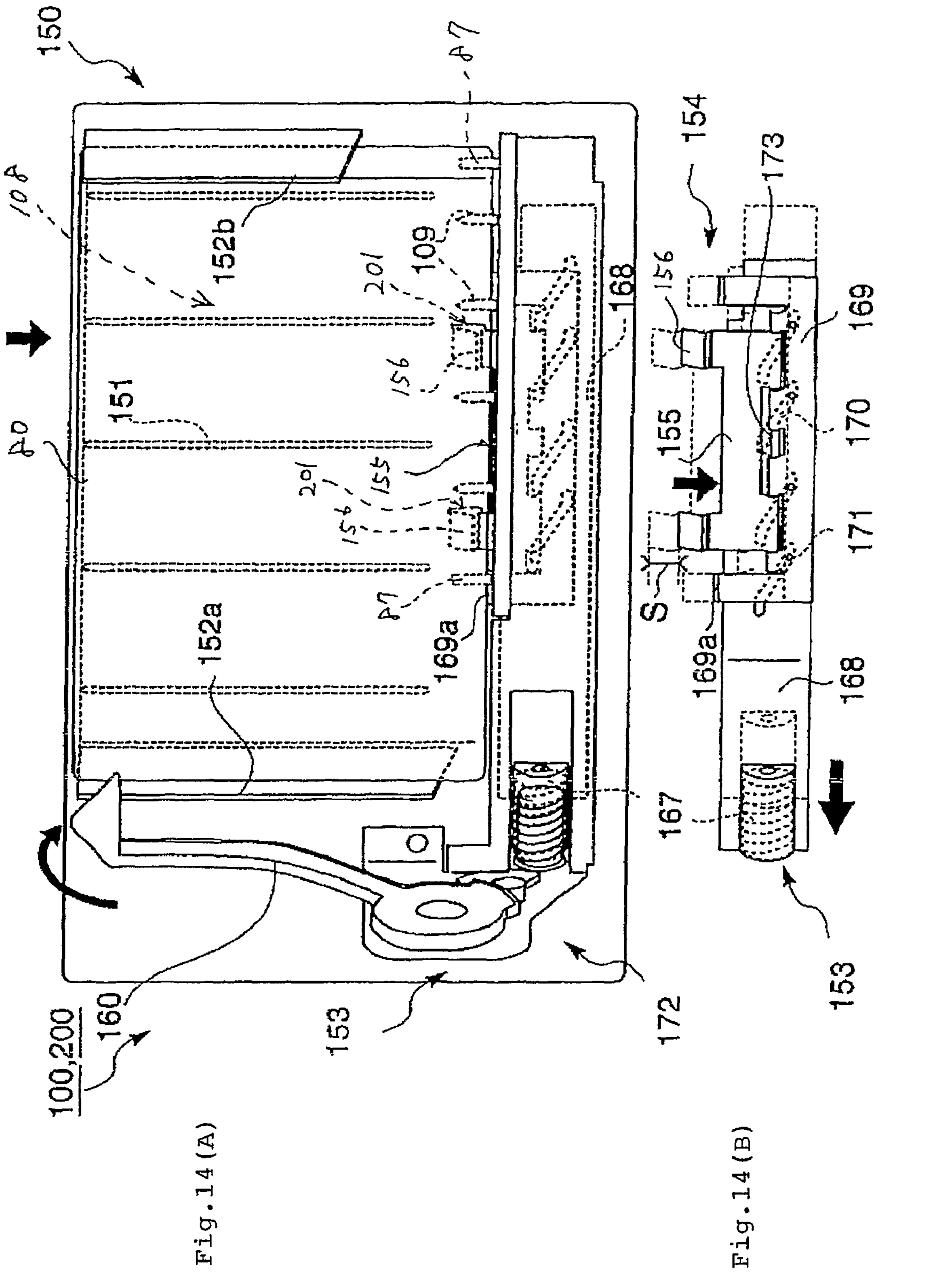
FIG. 14A is a top perspective view showing a state of the completion of loading of the cartridge in the cartridge loading/unloading device.
FIG. 14B is a view showing only the rotary slide portion in FIG. 14A.

FIG. 14A is a top perspective view showing a state of the completion of loading of the cartridge in the cartridge loading/unloading device 200, and FIG. 14B is a view showing only the rotary slide portion in FIG. 14A.

As shown in FIG. 14A, if a user rotates the lever arm 160 further than the state of FIG. 13A, the first slide member 168 further moves in the main scanning direction, whereby the second slide member 169 further moves in the ink cartridge insertion direction Y. Accordingly, as shown in FIG. 11D, loading of the ink cartridge 80 is completed. That is, the ink supply needles 109 will be in a state in which they are fully inserted into the liquid supply ports 82.

Then, the operation when the ink cartridge 80 is taken out will be described.

Figure 15A:
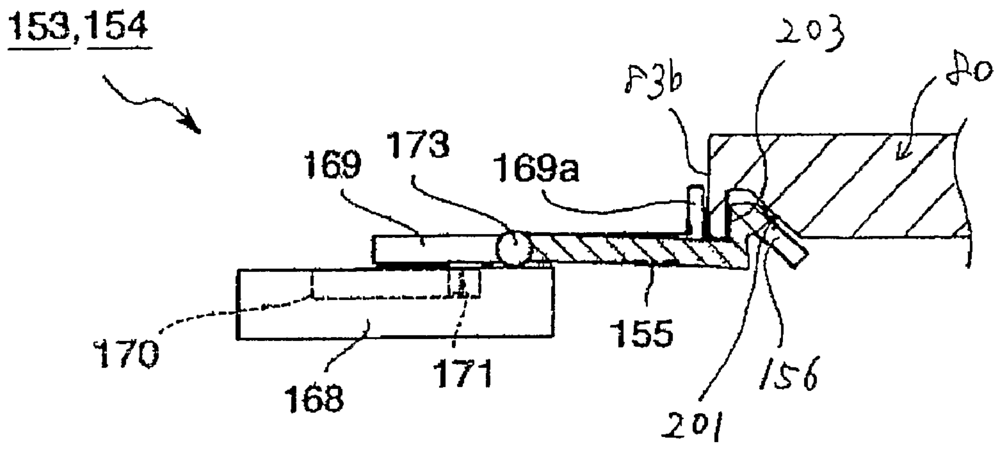
FIGS. 15A and 15B are sectional side views explaining the operation when the cartridge holding member with which the cartridge mounting section is equipped takes out liquid cartridge.
Figure 15B:
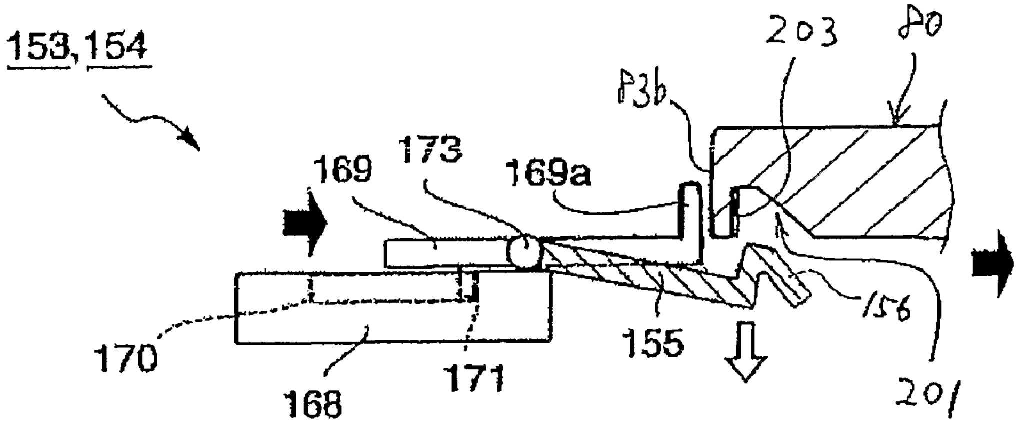

FIGS. 15A and 15B are sectional side views explaining the operation when the cartridge holding mechanism 154 takes out liquid cartridge 80. Of them, FIG. 15A shows a state in which the claws 156 of the engaging member 155 and the ink cartridge 80 engage with each other, and FIG. 15B shows a state in which the engagement is released.

If the lever arm 160 is rotated from the loading completion state in a direction opposite to the direction in which it is rotated at the time of loading of an ink cartridge, it will be in an insertion completion state of an ink cartridge shown in FIG. 15A and FIG. 12, and a state before loading of the ink cartridge.

Specifically, the first slide member 168 and the second slide member 169 shown in FIGS. 13 and 14 move respectively in the directions opposite to the directions of the arrows by reverse rotation of the lever arm 160. At this time, since the cartridge abutting parts 169*a* shown in FIGS. 11C and 11D abut against the front wall 83*b* of the container body 81 to press it, the ink cartridge 80 moves to the insertion completion state of an ink cartridge shown in FIGS. 15A and 12, that is, moves in the direction opposite to the direction of the arrow to the position before loading of the ink cartridge.

Subsequently, if the lever arm 160 is rotated in the reverse rotation direction further than the position shown in FIG. 12, as shown in FIG. 15B, the second slide member 169 moves nearer to the ink cartridge than the position shown in FIG. 11A. Accordingly, the engaging member 155 can retreat downwardly while it is regulated by the top surface of the second slide member 169, and can release the engagement between the claws 156 and the engaging recesses 201.

That is, since an ink cartridge 80 is released from the cartridge holding mechanism 154, this ink cartridge 80 can be taken out.

In addition, in order to facilitate take-out of an ink cartridge 80, it is natural that a spring can be provided so that the ink cartridge 80 may jump out by the force of the spring.

Further, it is natural that engagement and disengagement of the claws 156 and the engaging recesses 201 can be made smooth by changing the shape of the slide grooves 170, thereby moving the second slide member in the insertion direction Y of the ink cartridge 80 at the time of ink cartridge insertion and take-out. Moreover, it is needless to say that it is also possible to provide the pivot 173 with a torsion coil spring to cause the engaging member 155 to be urged downwardly, thereby releasing engagement from the engaging recesses 201.

The ink cartridge loading/unloading device 200 according to this embodiment is arranged to allow an ink cartridge 80 to be slid and loaded into the body of a recording apparatus. This ink cartridge loading/unloading device includes the cartridge holding mechanism 154 which holds the ink cartridge 80 by inserting the ink cartridge 80 by a first predetermined stroke, and the power transmission converting mechanism 153 which ensures a push-in force required for loading of the ink cartridge 80 using the principle of the lever by the rotational motion of the lever arm 160, and which converts the rotational motion of the lever arm 160 into the second predetermined stroke of movement required for loading of the ink cartridge 80 in a state in which it is held by the cartridge holding mechanism 154. The cartridge holding mechanism 154 includes the integral engaging member 155 which is engaged with the front side of one surface of the ink cartridge 80 in its loading direction across the center of the one surface.

As a result, even in a case where the integral engaging member 155 is intended to be engaged with an ink cartridge 80 in plural places, there is no possibility that the engaging member may be engage with the ink cartridge only in one place. That is, since the engaging member is integral, the engaging member is always engaged with the ink cartridge in all places or is not engaged with the ink cartage at all.

Further, since the engaging member 155 is engaged with the front side of the bottom surface of the ink cartridge 80 in its loading direction across the center thereof, even if the engaging member is engaged with the ink cartridge 80 only in one place, the engaging member can be allowed to be engaged with the portion of the ink cartridge 80 in a position near the center of gravity of the cartridge in a direction (main scanning direction X) vertical to the insertion direction. As a result, it is possible to suppress generation of a rotational force and it is also possible to reliably push in and load the ink cartridge 80.

Moreover, since the engaging member is allowed to be engaged with the front side of an ink cartridge in its loading direction, it is possible to hold the vicinities of the liquid supply ports 82 into which the ink supply needles 109 are inserted, respectively. Accordingly, the vicinities of the liquid supply ports 82 can be held, whereby the ink supply needles 109 can be inserted reliably.

Moreover, a relatively large leverage can be obtained by using the lever arm 160 which can take a relatively long distance between a point of action and a fulcrum. Therefore, since a large push-in force can be obtained with a very small force using the principle of the lever, even a single package type ink cartridge 80 can be loaded and taken out easily.

The power transmission converting mechanism 153 of this embodiment is adapted to move an ink cartridge 80 by the second predetermined stroke S. As a result, the power transmission converting mechanism can be made a simple structure.

Further, the engaging member 155 of this embodiment extends vertically to the insertion direction Y of an ink cartridge 80 and in the longitudinal direction X of this ink cartridge 80.

As a result, in a case in which the ink cartridge 80 has been inserted in a skew state, the ink cartridge is not engaged with the engaging member. However, only in a case in which the ink cartridge is not inclined in the longitudinal direction X, that is, the ink cartridge inserted in a normal state, the ink cartridge can be engaged with the engaging member 155. That is, the loading of an ink cartridge 80 in a skew state into the cartridge mounting section 108 can be prevented.

Moreover, since the engaging member 155 extends in a direction (main scanning direction X) vertical to the insertion direction Y of an ink cartridge 80, when an ink cartridge 80 is loaded, the engaging member 155 can apply a force required for loading in the same direction as the insertion direction Y to the ink cartridge 80.

Here, it is preferable that the length of the engaging member 155 in the main scanning direction be ⅓ or more of the length of the engagement surface of the ink cartridge 80.

And, in the ink cartridge 80 of this embodiment loaded into and unloaded from the cartridge mounting section 108 by the ink cartridge loading/unloading device 200, the top surface (bottom surface in a mounting state) of the container body 81 at its leading end is provided with the pair of engaging recesses 201 across a central portion of the container body 81 in its width direction. Therefore, the spacing between the engaging recesses 201 can be narrowed compared with the ink cartridge 508 which has the recesses (engaging recesses) 508*a* in both the right and left side surfaces of a container body.

Thus, when the ink cartridge 80 of this embodiment is inserted into the cartridge mounting section 108 of the ink jet printer 100, the engaging member 155 of the ink cartridge loading/unloading device 200 can be allowed to be engaged with the engaging recesses 201 on the side of the leading end of the container body 81 in its insertion direction, the container body 81 is hardly inclined at the time of cartridge mounting compared with the ink cartridge 508, whereby skew insertion of the ink cartridge 80 is prevented. Accordingly, the cartridge mounting section 108 can be reliably loaded with an ink cartridge 80, and occurrence of troubles the liquid leakage resulting from the erroneous loading by skew insertion, etc. can be prevented.

Further, in the ink cartridge 80 of this embodiment, since the engaging recesses 201 are provided near the front wall 83*b* which is the leading end surface of the container body 81 in the insertion direction, the engaging recesses 201 and the liquid supply ports 82 provided in the leading end surface of the container body 81 in the insertion direction are brought close to each other. As a result, variation in the positional accuracy of the engaging recesses 201 with respect to the ink supply needles 109 serving as an ink supply portion provided on the cartridge mounting section 108 side can be reduced, and the right and left inclination of the container body 81 can be further prevented.

Further, in the ink cartridge 80 of this embodiment, since the engaging recesses 201 are formed near the positioning holes 85*a* and 85*b* which position the container body 81 with respect to the cartridge mounting section 108, the positional accuracy of the engaging recesses 201 with respect to the ink supply needles 109, etc. provided on the cartridge mounting section 108 side can be further improved, and inclination prevention of the container body 81 can be further promoted.

Moreover, in the ink cartridge 80 of this embodiment, the engaging recesses 201 are disposed between the pair of positioning holes 85*a* and 85*b* provided in both sides in the leading end surface of the container body 81 in the insertion direction. Therefore, since the inclination (amount of offset) occurring between the engaging recesses 201 is regulated to be smaller than the amount of offset between the pair of positioning holes 85*a* and 85*b* when the container body 81 is inserted, the inclination can be further suppressed.

Moreover, in the ink cartridge 80 of this embodiment, as the engaging member 155 of the ink cartridge loading/unloading device 200 presses and urges the abutting parts 203 provided in the front wall surfaces of the engaging recesses 201 in the insertion direction, the container body 81 is moved in the cartridge mounting direction.

Thus, even if there is an error in the length dimensions, etc. of the container body 81 in the insertion direction, regardless of the dimensional error of the container body 81, the abutment between the claws 156 and the abutting parts 203 can be made uniform by allowing the claws 156 of the engaging member 155 to abut against the abutting parts 203 of the engaging recesses 201. Thus, it is possible to improve the positioning accuracy of an ink cartridge 80 at the time of insertion, and to load the ink cartridge more reliably.

Further, in the ink cartridge 80 of this embodiment, since the position of the abutting parts 203 in its height direction is disposed near the horizontal plane passing through the centers of the pair of positioning holes 85*a* and 85*b*, the pressing force which acts on the abutting parts 203 from the engaging member 155 of the ink cartridge loading/unloading device 200 acts in the substantially horizontal plane passing through the centers of the positioning holes 85*a* and 85*b*, and the component force which twists the leading end of the cartridge upwardly or downwardly is not generated. Therefore, the upward and downward inclination of the container body 81 can be prevented.

Further, in the ink cartridge 80 of this embodiment, the ribs 203*r* of the abutting part 203 are formed near both the side walls 201*c* in the insertion direction in the front wall surface 201*b* of the engaging recess 201 in the insertion direction. The vicinities of both the side walls 201*c* of the engaging recess 201 in the insertion direction formed in the shape of a box are located near corners and thus have a high rigidity. Thus, by constructing the abutting part 203 by means of the ribs 203*r* located near both the side walls 201*c* having a high rigidity, for example, the rigidity of the abutting part 203 becomes high and the positioning accuracy at the time of abutment of the engaging member 155 of the ink cartridge loading/unloading device 200 improves, as compared with a case where the abutting part is provided in the center of the front wall surface 201*b* in the insertion direction.

Further, in the ink cartridge 80 of this embodiment, the container body 81 includes the pair of upper and lower cases 83 and 84, and the abutting parts 203 are provided to one of the cases, i.e. the case 83, which is positioned with respect to the cartridge mounting section 108.

Thus, since the positioning holes 85*a* and 85*b* with respect to the cartridge mounting section 108 and the abutting parts 203 that are positioning means for the engaging member 155 of the ink cartridge loading/unloading device 200 are disposed on the common case 83, deterioration of positioning accuracy caused by the assembling error of case parts can be avoided, and the operation by the ink cartridge loading/unloading device 200 can be made smoother by an improvement in positioning accuracy.

In addition, the specific construction etc. of each configuration of the liquid cartridge according to the present invention is not limited to the embodiment, but can be appropriately modified without departing from the sprit and scope of the present invention. It is needless to say that these modifications are also included in the scope of the present invention.

For example, in the liquid cartridge according to the present invention, the position where the engaging recesses which engage the engaging member of a cartridge loading/unloading device are provide may be any of the top surface and the bottom surface orthogonal to the leading end surface of a container body of the insertion direction, and the position may be determined in consideration of the moldability, etc. of each of the upper and lower cases.

Other Embodiments

The ink cartridge loading/unloading device described hitherto loads an ink cartridge by inserting the ink cartridge by a first predetermined stroke to be held by the cartridge holding mechanism 154 and then moving the ink cartridge. That is, the ink supply needles are always fixed, and the ink cartridge always moves from insertion to loading.

On the other hand, in an ink cartridge loading/unloading device according to another embodiment, an ink cartridge is first inserted and held by the cartridge holding mechanism, and thereafter, the ink supply needles are moved toward the ink cartridge to complete loading. Hereinafter, this will be described in detail.

Figure 16:
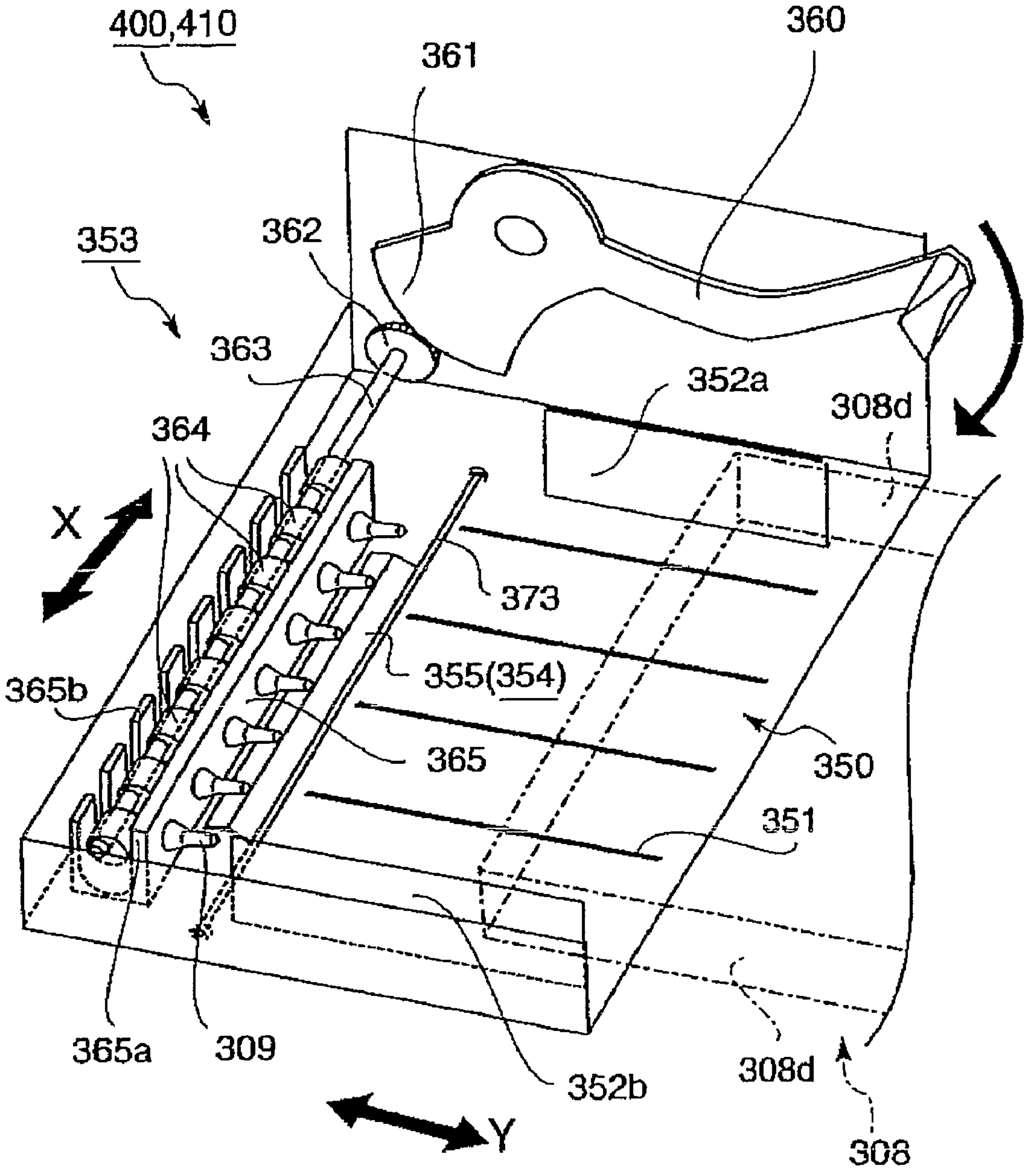
FIG. 16 is a perspective view of a cartridge loading/unloading device in another embodiment according to the present invention.

FIG. 16 is a perspective view of an ink cartridge loading/unloading device (cartridge loading/unloading device) 410 in another embodiment according to the present invention.

Figure 17A:
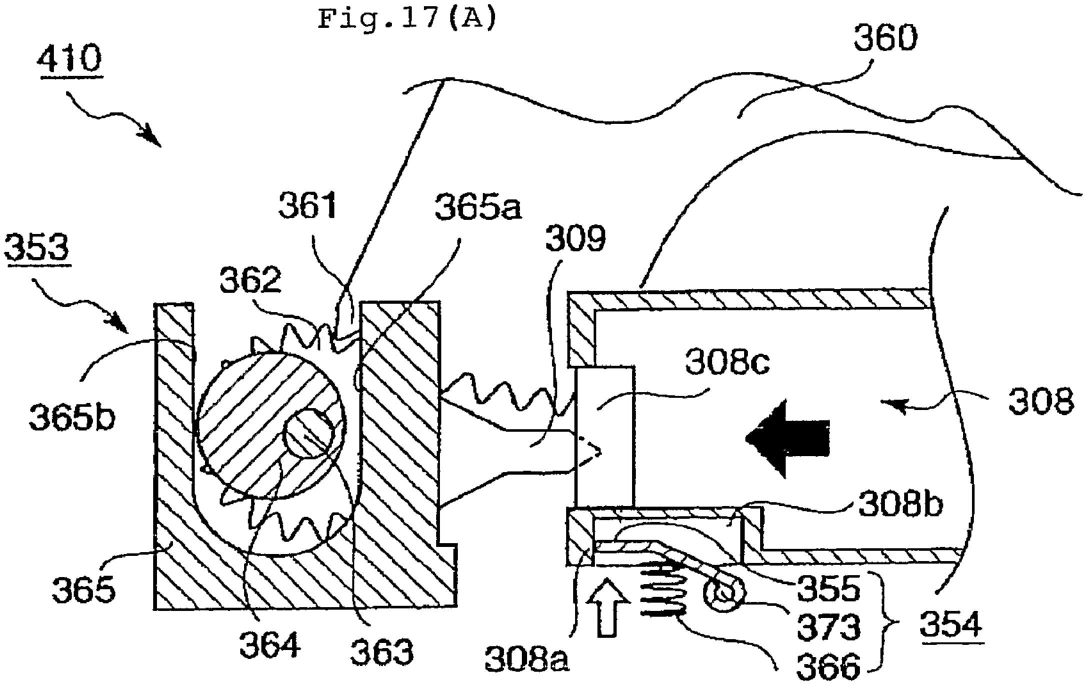
FIGS. 17A and 17B are enlarged side views of essential parts of the cartridge loading/unloading device shown in FIG. 16.
Figure 17B:
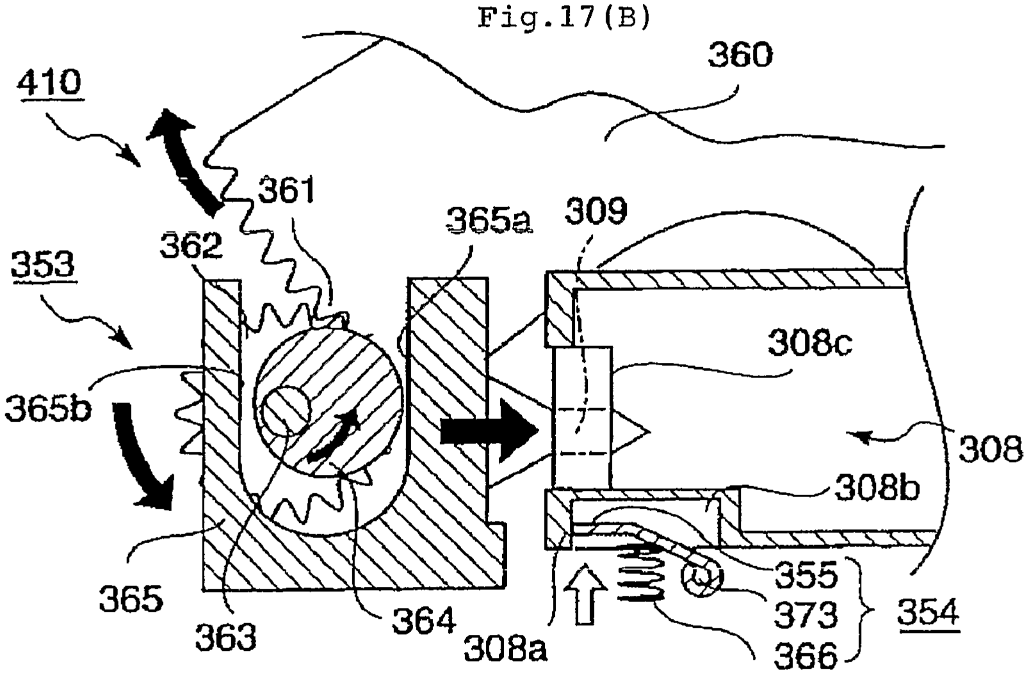
Figure 18:
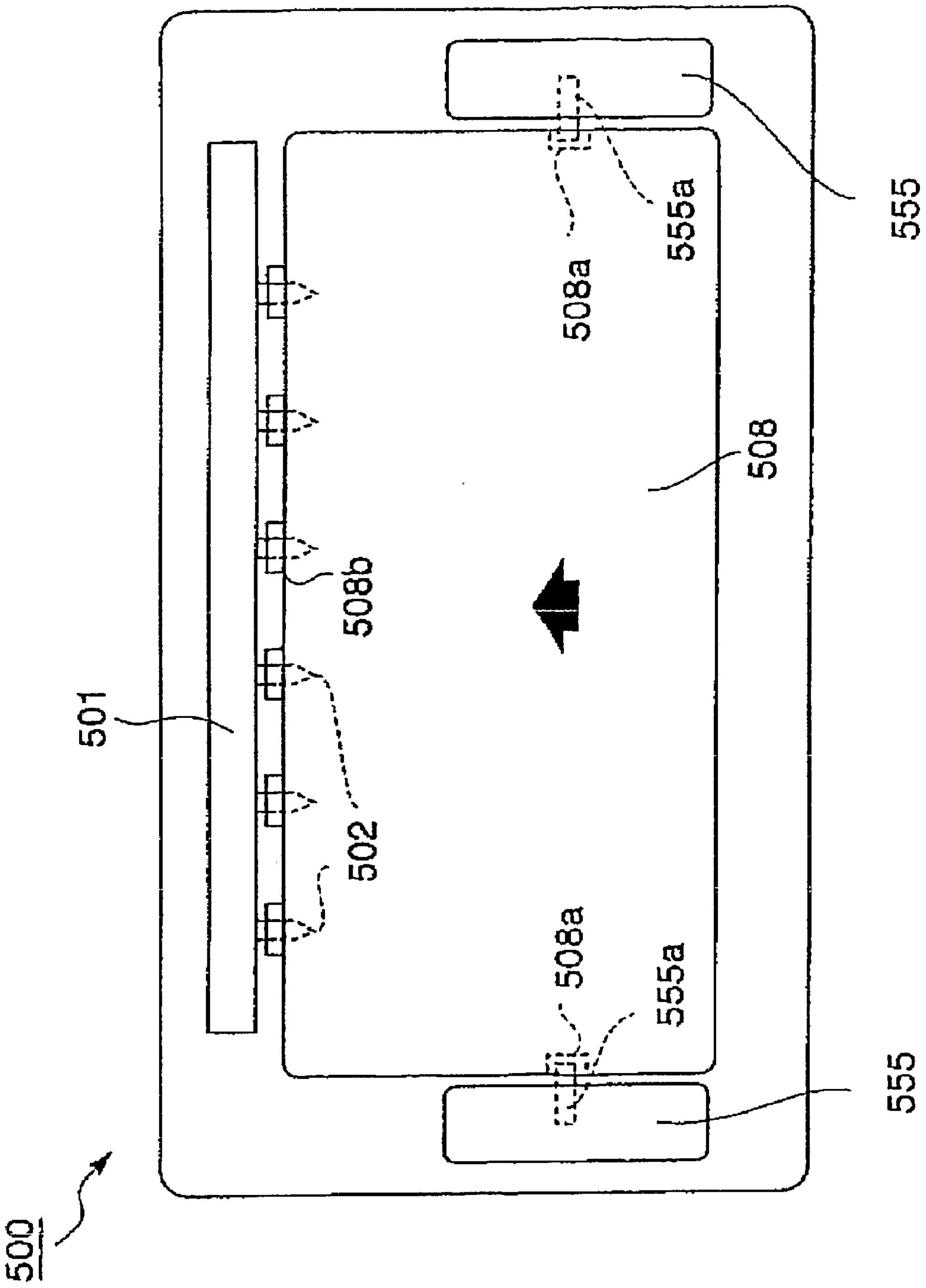
FIG. 18 is a plan view showing a state in which a conventional liquid cartridge is mounted on a cartridge mounting section.

FIGS. 17A and 17B are enlarged side views of essential parts of the ink cartridge loading/unloading device shown 410 in the other embodiment according to of the present invention. Specifically, FIG. 17A shows a state of insertion completion of an ink cartridge before loading thereof, and FIG. 17B shows a state of insertion completion and loading completion of an ink cartridge.

As shown in FIG. 16, a main frame 350 of an ink jet printer (recording apparatus) 400 is provided with guide ribs 351 which, when an ink cartridge 308 is inserted, supports the ink cartridge 308 from below. The main frame is also provided with guides 352*a* and 352*b* which, when the ink cartridge 308 is inserted, abuts against side surfaces 308*d* of the ink cartridge 308 to regulate the ink cartridge 308 in a right-and-left width direction.

Further, an ink cartridge loading/unloading device 410 includes a lever arm 360, a power transmission converting mechanism 353, and a cartridge holding mechanism 354. Among them, the power transmission converting mechanism 353 includes a fifth gear 361, a sixth gear 362, the cam shaft 363, cam parts 364, and a flow passage unit 365. Further, the cartridge holding mechanism 354 includes an engaging member 355.

The lever arm 360 operated by the user at the time of loading/unloading of the ink cartridge 308 is provided on the back side of the drawing. The lever arm 360 is provided with the fifth gear 361. The power of the fifth gear 361 is transmitted to the sixth gear 362 to rotate the cam shaft 363 integrally with the sixth gear and extending in the longitudinal direction (main scanning direction X) of the inserted surface of the ink cartridge 308. As the cam shaft is rotated, the plurality of cam parts 364 using the cam shaft as a fulcrum moves the flow passage unit 365 in the ink cartridge insertion direction Y via. In this case, the flow passage unit 365 is provided with a plurality of ink supply needles (needles) 309. Each cam part 364 is provided between the adjacent ink supply needles 309 in the main scanning direction X to abut against and urge a first wall part 365*a* provided in the flow passage unit 365, or a second wall part 365*b* to reciprocate the flow passage unit.

Further, the engaging member 355 which is engageable with the ink cartridge 308 is provided in the main frame 350 close to the ink supply needles 309 so as to extend in the longitudinal direction X of the ink cartridge 308. The engaging member 355 is urged upwards by an engaging spring 366 (refer to FIG. 17) and rotates about a pivot 373 as a fulcrum.

As shown in FIG. 17A, a single continuous engaging recess 308*b* is provided in the bottom surface of the ink cartridge 308 to extend in the longitudinal direction X of the ink cartridge 308 across the center of the ink cartridge 308 in the longitudinal direction X, in contrast to the first embodiment in which plural separate engaging recesses 201 are provided. Similarly to the first embodiment, the engaging recess 308*b* may be divided into two or more separate engaging recesses. Cartridge engaging parts (abutting parts) 308*a* are provided in the bottom surface of the ink cartridge 308 within the engaging recess 308*b*. At least two engaging parts (abutting parts) 308*a* are provided to be opposed to each other in the longitudinal direction X of the ink cartridge 308 with respect to the center of the ink cartridge 308 in the longitudinal direction X. If the ink cartridge 308 is inserted in the direction of the arrow, the engaging member 355 abuts against the edge of the front wall of the ink cartridge 308 and retreats downwardly once. After the cartridge engaging parts 308*a* pass over the engaging member 355, the engaging member 355 moves toward the recess 308*b* again by the spring force of the engaging spring 366 upwardly. At this time, the engaging member 355 and the cartridge engaging parts 308*a* are engaged with each other with a click so to be in an insertion completion state of the ink cartridge 308 which has been inserted by a first predetermined stroke. That is, the ink cartridge 308 is in a state where it is held by the cartridge holding mechanism 354.

Subsequently, the ink cartridge is loaded by rotating the lever arm 360 shown in FIG. 16 in the direction of the arrow from the insertion completion state of the ink cartridge.

As shown in FIG. 17B, when the fifth gear 361 rotates clockwise by the rotation of the lever arm 360, the sixth gear 362 rotates 180° counterclockwise. Since the cam shaft 363 rotates in synchronization with the sixth gear 362, the cam parts 364 rotate 180°. The cam parts 364 abuts against and urges the first wall part 365*a* in the flow passage unit 365 to move the flow passage unit 365 to the right in the drawing. At this time, the ink supply needles 309 formed in the flow passage unit 365 are inserted into the needle insertion openings 308*c* formed in the ink cartridge 308, so as to be in a loading completion state of the ink cartridge.

Further, when the ink cartridge 308 is taken out, and if the lever arm 360 is rotated counterclockwise opposite to the direction in which it is rotated in FIG. 17 at the time of loading of the ink cartridge, the sixth gear 362 rotates 180° clockwise. Accordingly, the cam parts 364 rotate 180° about the cam shaft 363 as a fulcrum clockwise from the position of FIG. 17B, and are separated from the first wall part 365*a* to abut against and urge the second wall part 365*b* formed in a position which faces the first wall part 365*a* to move the flow passage unit 365 to the left in the drawing. At this time, the ink supply needles 309 formed in the flow passage unit 365 will be in a state, as shown in FIG. 17A, in which they are drawn out of the needle insertion openings 308*c* formed in the ink cartridge 308.

And, if the lever arm 360 is further rotated counterclockwise a disengaging member (not shown) pushes down the engaging member 355 against the urging force of the engaging spring 366. Accordingly, the engagement of the cartridge engaging parts 308*a* and the engaging member 355 is released, whereby the ink cartridge 308 can be taken out.

In addition, in order to facilitate take-out of the ink cartridge 308, it is natural that a spring can be provided so that the ink cartridge 308 may jump out by the force of the spring.

The ink cartridge loading/unloading device 410 according to this embodiment is arranged to allow the ink cartridge 308 to be slid and loaded into the body of a recording apparatus. This ink cartridge loading/unloading device includes the cartridge holding mechanism 354 which holds the ink cartridge 308 by inserting the ink cartridge 308 by a first predetermined stroke, and the power transmission converting mechanism 353 which ensures a push-in force required for loading of the ink cartridge 308 using the principle of the lever by the rotational motion of the lever arm 360, and which converts the rotational motion of the lever arm 360 into the second predetermined stroke of movement required for loading of the ink cartridge 308 in a state in which it is held by the cartridge holding mechanism 354. The cartridge holding mechanism 354 includes the integral engaging member 355 which is engaged with the front side of one surface of the ink cartridge 308 in its loading direction across the center of the one surface.

As a result, since the engaging member 355 is engaged with the front side of the one surface of the ink cartridge 308 in its loading direction across the center thereof, even if the engaging member is engaged with the ink cartridge 308 only in one place, the engaging member can be allowed to be engaged with the portion of the ink cartridge 308 in a position near the center of gravity of the cartridge in a direction (main scanning direction X) vertical to the insertion direction. That is, it is possible to suppress generation of a rotational force of the ink cartridge 308 and it is also possible to reliably push in and load the ink cartridge 308. Therefore, there is no possibility that the ink cartridge 308 may be skewed at the time of loading thereof.

Moreover, since the engaging member is allowed to be engaged with the front side of an ink cartridge in its loading direction, it is possible to hold the vicinities of the liquid supply ports 308*c* into which the ink supply needles 309 are inserted, respectively. Accordingly, the vicinities of the liquid supply ports 308*c* can be held, whereby the ink supply needles 309 can be inserted reliably.

The power transmission converting mechanism 353 of this embodiment is adapted to move the flow passage unit 365 including the needles 309 to be inserted into the ink cartridge 308 by the second predetermined stroke S.

As a result, it is not necessary to move a heavy ink cartridge 308. That is, when an ink cartridge 308 is loaded, the ink cartridge 308 in which ink is fully contained is heavy, and therefore an ink cartridge 308 can be loaded with a smaller force by moving the flow passage unit 365 including the needles 309.

Further, the engaging member 355 of this embodiment extends vertically to the insertion direction Y of an ink cartridge 308 and in the longitudinal direction X of this ink cartridge 308.

As a result, in a case in which the ink cartridge 308 has been inserted in a skew state, there is no possibility that the ink cartridge 308 may be engaged with the engaging member 355. That is, only in a case in which the ink cartridge is normally inserted without being inclined with respect to the recoding apparatus body, the ink cartridge is engaged with the engaging member. As a result, there is no possibility that an ink cartridge 308 is loaded in a skew state.

Moreover, when an ink cartridge 308 is loaded, the engaging member 355 can apply a force required for loading in the same direction as the insertion direction Y to the ink cartridge 308. That is, it is possible to oppose a force required when the ink supply needles 309 are inserted (loaded) into the ink cartridge 308.

Here, it is preferable that the length of the engaging member 355 in the main scanning direction be ⅓ or more of the length of the engagement surface of the ink cartridge 308.

In addition, the present invention is not limited to the embodiments, but can be modified in various ways within the scope thereof as defined in the claims. It is needless to say that these modifications are also included in the scope of the present invention.

For example, the liquid consuming apparatus to be equipped with the liquid cartridge according to the present invention is not limited to the ink jet printer shown in the embodiments.

The terms "top", "bottom", "right", "left", etc. are relative, and are not intended to limit the scope of the invention. For example, when the liquid cartridge is placed upside down, the "bottom" wall 83*a* becomes a "top" wall, and when the liquid cartridge is placed such that the "side" walls 83*d*, 83*e* are opposed to each other in a direction of gravity, the "top" wall and the "bottom" wall become "side" walls.

INDUSTRIAL APPLICABILITY

The present invention is applicable to a liquid cartridge, a loading/unloading device which allows the liquid cartridge to be slid and loaded on a recording apparatus body, a recording apparatus including the loading/unloading device, and a liquid ejection apparatus including the loading/unloading device.

The invention claimed is:

1. A liquid cartridge containing liquid therein, adapted to be inserted into a cartridge mounting section of a liquid consuming apparatus in a first direction, and adapted to be detachably mounted on the liquid consuming apparatus by a cartridge loading/unloading device, the liquid cartridge comprising:

a front wall adapted to be a leading end surface when the liquid cartridge is inserted into the cartridge mounting section, the front wall having a pair of longitudinal sides and a pair of transverse sides perpendicular to the pair of longitudinal sides, wherein the pair of longitudinal sides are longer than the pair of transverse sides;

a rear wall opposing the front wall;

a top wall intersecting with the front wall at a top of one of the pair of longitudinal sides and the rear wall;

a bottom wall intersecting with the front wall at a bottom one of the pair of longitudinal sides and the rear wall; and at least one liquid supply port provided on the front wall and adapted to supply the liquid therefrom to at least one liquid supply portion provided on the cartridge mounting section when the liquid cartridge is mounted on the liquid consuming apparatus;

a first engaging recess and a second engaging recess provided on one of the top wall and the bottom wall, the first and second engaging recesses being located proximate one of the longitudinal sides of the front wall such that the first engaging recess being located between a center in a longitudinal direction of the front wall and a first one of the transverse sides of the front wall, the second engaging recess being located between the center in the longitudinal direction of the front wall and a second one of the transverse sides, the first and second engaging recesses being adapted to be engaged with an engaging member of the cartridge loading/unloading device when the liquid cartridge is inserted into the cartridge mounting section; and a first abutting part provided in the first engaging recess and adapted to come in contact with the engaging member when the liquid cartridge is inserted into the cartridge mounting section; and a second abutting part provided in the second engaging recess, and adapted to come in contact with the engaging member when the liquid cartridge is inserted into the cartridge mounting section.

2. The liquid cartridge according to claim 1, wherein the first engaging recess and the second engaging recess are provided at a position closer to the front wall than the rear wall.

3. The liquid cartridge according to claim 1, further comprising positioning means configured to position the liquid cartridge with respect to the cartridge mounting section when the liquid cartridge is inserted into the cartridge mounting section.

4. The liquid cartridge according to claim 3, wherein:

the positioning means includes a first positioning hole provided on the front wall and located at a first side closer to the first one of the transverse sides relative to the center, and a second positioning hole provided on the front wall and located at a second side closer to the second one of the transverse sides relative to the center; and the first engaging recess and the second engaging recess are disposed between the first positioning hole and the second positioning hole.

5. The liquid cartridge according to claim 1, wherein the first abutting part and the second abutting part are adapted to be urged by the engaging member in the first direction.

6. The liquid cartridge according to claim 5, wherein the first abutting part and the second abutting part are located near a horizontal plane passing through centers of the first positioning hole and the second positioning hole.

7. The liquid cartridge according to claim 2, wherein the first engaging recess and the second engaging recess are provided adjacently to the front wall.

8. The liquid cartridge according to claim 7, wherein each of the first abutting part and the second abutting part is defined by a back surface of the front wall.

9. The liquid cartridge according to claim 1, wherein the first abutting part is defined as a part of the first engaging recess and the second abutting part is defined as a part of the second engaging recess.

10. The liquid cartridge according to claim 9, wherein each of the first abutting part and the second abutting part includes a pair of ribs.

11. The liquid cartridge according to claim 1, wherein the first abutting part and the second abutting part are adapted to be urged by the engaging member in the first direction.

12. The liquid cartridge according to claim 1, further comprising a pair of positioning holes provided on the front wall and spaced from each other in the longitudinal direction, wherein the abutting parts are located between the positioning holes in the second direction.

13. The liquid cartridge according to claim 1, wherein:

the at least one liquid supply port includes a first liquid supply port, a second liquid supply port, a third liquid supply port and a forth liquid supply port which are arrayed in the second direction in this order;

the first abutting part is located between the first liquid supply port and the second liquid supply port; and the second abutting part is located between the third liquid supply port and the fourth liquid supply port.

14. The liquid cartridge according to claim 13, further comprising:

a first side wall intersecting with the front wall, the rear wall, the top wall and the bottom wall;

a second side wall opposite to the first side wall and intersecting with the front wall, the rear wall, the top wall and the bottom wall;

first positioning means adapted to receive a first positioning pin of the liquid consuming apparatus when the liquid cartridge is inserted into the cartridge mounting section, and located between the first liquid supply port and the first side wall; and second positioning means adapted to receive a second positioning pin of the liquid consuming apparatus when the liquid cartridge is inserted into the cartridge mounting section, and located between the fourth liquid supply port and the second side wall.

* * * * *